US007913968B2

(12) United States Patent
Sullivan et al.

(10) Patent No.: US 7,913,968 B2
(45) Date of Patent: Mar. 29, 2011

(54) ACTION WOBBLE SPRING MOUNTING ASSEMBLY AND METHOD OF MANUFACTURE

(75) Inventors: John C. Sullivan, Madison, CT (US); Jeffrey Stanley Samson, Irvine, CA (US); Robert F. Morton, Sarasota, FL (US); Cory Price, Newport Beach, CA (US)

(73) Assignee: Action Wobble, Inc., Irvine, CA (US)

( * ) Notice: Subject to any disclaimer, the term of this patent is extended or adjusted under 35 U.S.C. 154(b) by 500 days.

(21) Appl. No.: 11/551,945

(22) Filed: Oct. 23, 2006

(65) Prior Publication Data

US 2007/0089334 A1 Apr. 26, 2007

Related U.S. Application Data

(60) Provisional application No. 60/729,294, filed on Oct. 21, 2005.

(51) Int. Cl.
*F16M 11/00* (2006.01)

(52) U.S. Cl. ......................... 248/623; 248/624; 446/330

(58) Field of Classification Search .................. 248/618, 248/624, 625; 446/330, 396
See application file for complete search history.

(56) References Cited

U.S. PATENT DOCUMENTS 75,306 A * 3/1868 Smith .......................... 248/624
2,243,912 A 6/1941 Legler
4,830,345 A * 5/1989 Mar .............................. 267/133
5,836,803 A 11/1998 Hamlin
6,129,606 A * 10/2000 Yuen ............................ 446/325
6,398,274 B1 6/2002 Huang et al.
6,533,634 B1 3/2003 Sugar
6,899,589 B1 * 5/2005 Lund et al. .................... 446/351
6,994,528 B2 * 2/2006 Brashears et al. ............ 417/234
2005/0001113 A1 * 1/2005 Sullivan et al. ............... 248/127
2005/0087547 A1 4/2005 Dinhofer
2005/0212306 A1 9/2005 Huang
2007/0117494 A1 * 5/2007 Sheller .......................... 446/309
2007/0176073 A1 * 8/2007 Simic ............................ 248/576

OTHER PUBLICATIONS

Supplementary European Search Report, issued Aug. 6, 2009 in corresponding European patent application No. 06817364.0.
International Search Report and Written Opinion, issued Sep. 4, 2008 in corresponding PCT Application Serial No. PCT/US2006/041561.

* cited by examiner

*Primary Examiner* — Terrell McKinnon
*Assistant Examiner* — Steven M Marsh
(74) *Attorney, Agent, or Firm* — Pearne & Gordon LLP

(57) ABSTRACT

A mounting assembly for an object is provided, including a first mounting element, a second mounting element, and a resilient spring located therebetween. An object can be secured to either one of the first mounting element and the second mounting elements. In addition or alternatively, a method of manufacturing the mounting assembly is also provided. The method includes the steps of molding a resilient spring directly to the first mounting element, attaching the second mounting element to the spring, and attaching an object to either of the first and second mounting elements. In addition or alternatively, another method of manufacturing is provided for manufacturing a plurality of mounting assemblies. In addition or alternatively, the first mounting element can include a base member and a leg member. In one example, the leg member can be movable relative to the base member.

54 Claims, 23 Drawing Sheets

ACTION WOBBLE SPRING MOUNTING ASSEMBLY AND METHOD OF MANUFACTURE

RELATED APPLICATIONS

This application claims the benefit of U.S. Provisional Application No. 60/729,294 filed on Oct. 21, 2005, the entire disclosure of which is hereby incorporated herein by reference.

FIELD OF THE INVENTION

The present invention relates to a spring mounting assembly, and more particularly, to a spring mounting assembly for use with customizable wobble objects.

BACKGROUND OF THE INVENTION

Bobblehead dolls are popular toy figurines, which feature a mounted head that allows movement. It is common for the head to be connected with a spring, which allows random movement in limited directions. This movement is frequently termed as bobbing or bobbling.

The bobblehead dolls are typically small ceramic, resin, or plastic cast stationary bodies with spring mounted distinctive heads featuring the likenesses of a variety of stars (e.g., sports, movie, rock, historic persons). The motion in the toy figurines is supplied by a vertically mounted spring, most often attached in or as a neck under a hollow bobbling head. Recent updates to the bobblehead dolls include a plastic portrait window mounted in place of the face.

Additionally, various products, such as greeting cards, books, magazines, business cards, and the like can feature "pop-up" images designed to create a "3D" effect. Conventionally, a "pop-up" image is created through the use of a spring, such as a metal coil spring, that is glued or otherwise adhered individually to the book, magazine, etc. However, the use of such a spring is costly, inefficient, and difficult to customize.

BRIEF SUMMARY OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some concepts of the invention in a simplified form as a prelude to the more detailed description that is presented later.

In accordance with an aspect of the present invention, a method of manufacturing a mounting assembly is provided. The method includes the steps of providing at least one first mounting element and molding a resilient spring directly to the first mounting element. The spring including a first end portion and a second end portion, and the first end portion is molded to the first mounting element. The method also includes the steps of providing at least one second mounting element, attaching the second mounting element to the second end of resilient spring to form the mounting assembly, providing an object for attachment to the mounting assembly, and attaching the object to either one of the first mounting element and the second mounting element.

In accordance with another aspect of the present invention, a method of manufacturing a plurality of mounting assemblies is provided. The method includes the steps of providing a plurality of first mounting elements provided as a first sheet of material and molding a plurality of resilient springs. Each resilient spring is molded directly to a selected one of the plurality of first mounting elements. Each spring includes a first end portion and a second end portion, and the first end portion is molded to the first mounting element. The method also includes the steps of providing a plurality of second mounting elements provided as a second sheet of material, and attaching each of the plurality of second mounting elements to a selected one of the plurality of resilient springs at the second end of the selected resilient spring to form each mounting assembly.

In accordance with another aspect of the present invention, a mounting assembly for an object is provided. The mounting assembly includes a first mounting element including an aperture defined by a peripheral edge, and a resilient spring including a first end portion and a second end portion. The first end portion is attached to at least a portion of the peripheral edge of the aperture. The mounting assembly further includes a second mounting element attached to the second end of resilient spring, and an object secured to either one of the first mounting element and the second mounting element.

In accordance with another aspect of the present invention, a method of manufacturing a mounting assembly is provided. The method includes the steps of molding at least one first mounting element, and molding a resilient spring directly to the first mounting element. The spring includes a first end portion and a second end portion. The first end portion is molded to the first mounting element, and the first mounting element and the resilient spring are molded substantially simultaneously. The method further includes the steps of providing at least one second mounting element, attaching the second mounting element to the second end of resilient spring to form the mounting assembly, providing an object for attachment to the mounting assembly, and attaching the object to either one of the first mounting element and the second mounting element.

In accordance with yet another aspect of the present invention, a mounting assembly for an object is provided. The mounting assembly includes a first mounting element including an aperture defined by a peripheral edge. The first mounting element further includes a base member and a leg member attached to the base member. The mounting assembly further includes a resilient spring including a first end portion and a second end portion. The first end portion is attached to at least a portion of the peripheral edge of the aperture. The mounting assembly further includes a second mounting element attached to the second end of resilient spring, and an object secured to either one of the first mounting element and the second mounting elements.

BRIEF DESCRIPTION OF THE DRAWINGS

The foregoing and other features and advantages of the present invention will become apparent to those skilled in the art to which the present invention relates upon reading the following description with reference to the accompanying drawings.

DESCRIPTION OF EXAMPLE EMBODIMENTS

Figure 1A:
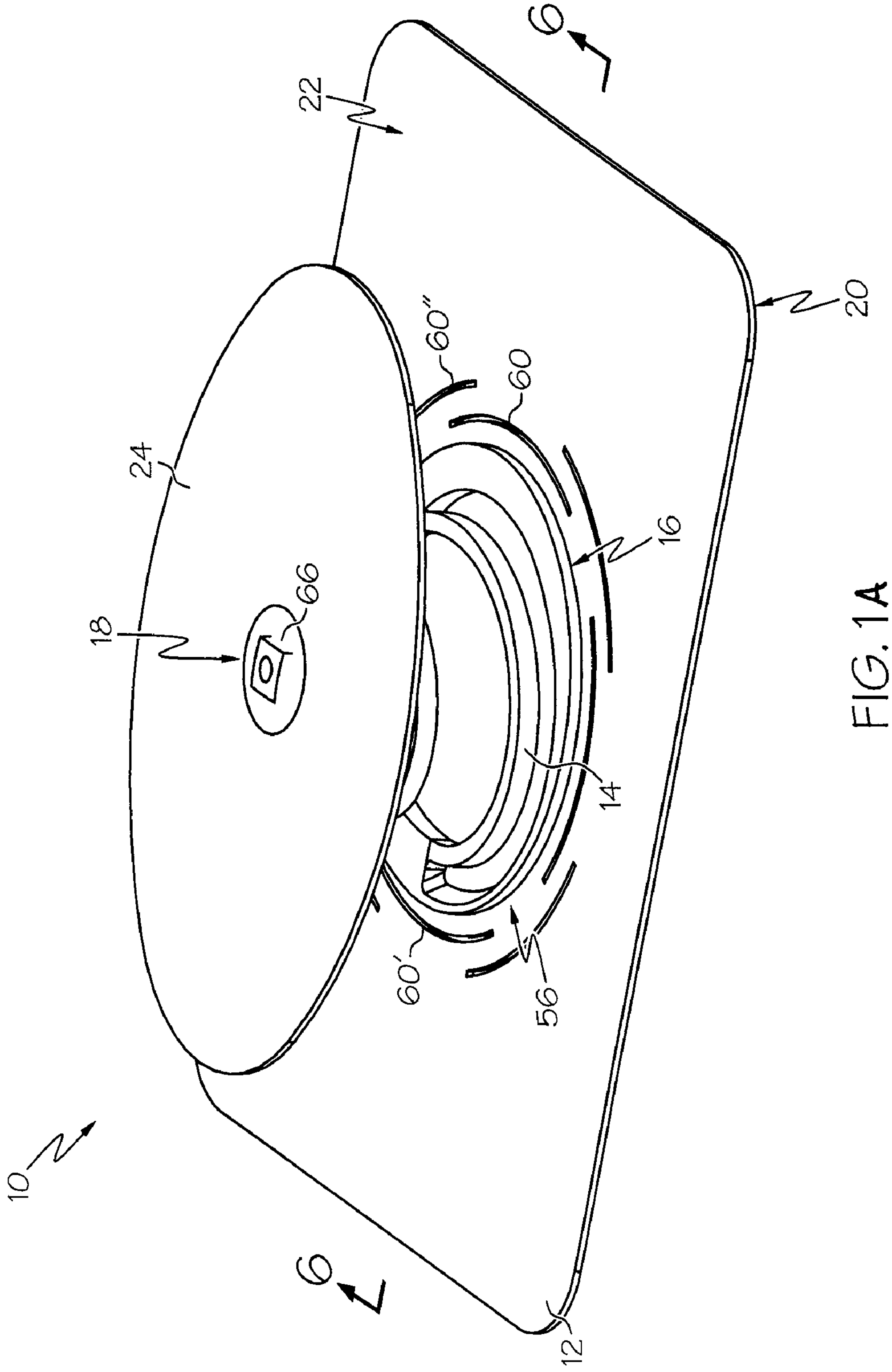
FIG. 1A illustrates a perspective view of an example mounting assembly in accordance with an aspect of the present invention.

An example embodiment of a device that incorporates aspects of the present invention is shown in the drawings. It is to be appreciated that the shown example is not intended to be a limitation on the present invention. For example, one or more aspects of the present invention can be utilized in other embodiments and even other types of devices.

Figure 1B:
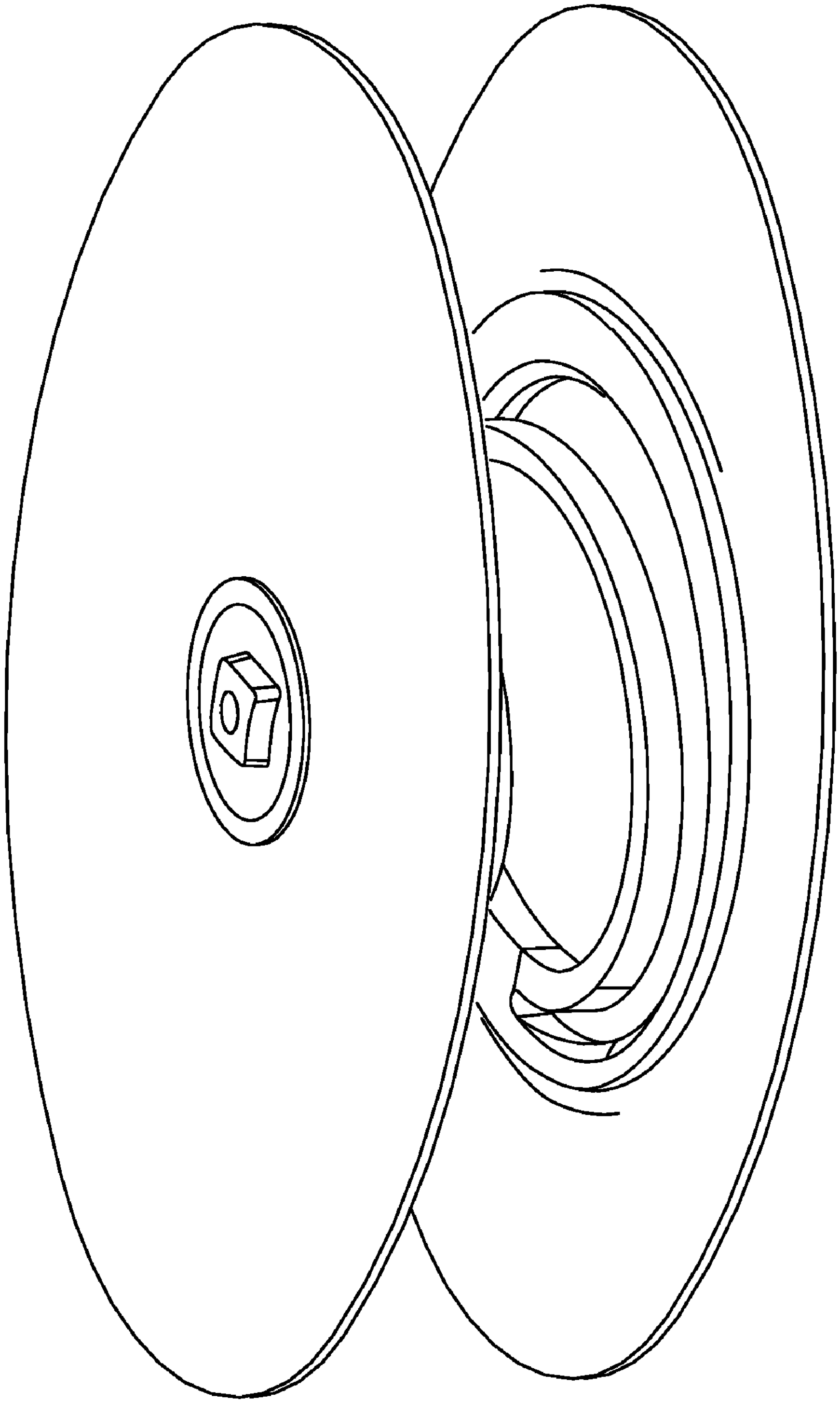
FIG. 1B is similar to FIG. 1A, but illustrates another example mounting assembly including first and second mounting plates having similar geometry in accordance with an aspect of the present invention.
Figure 17:
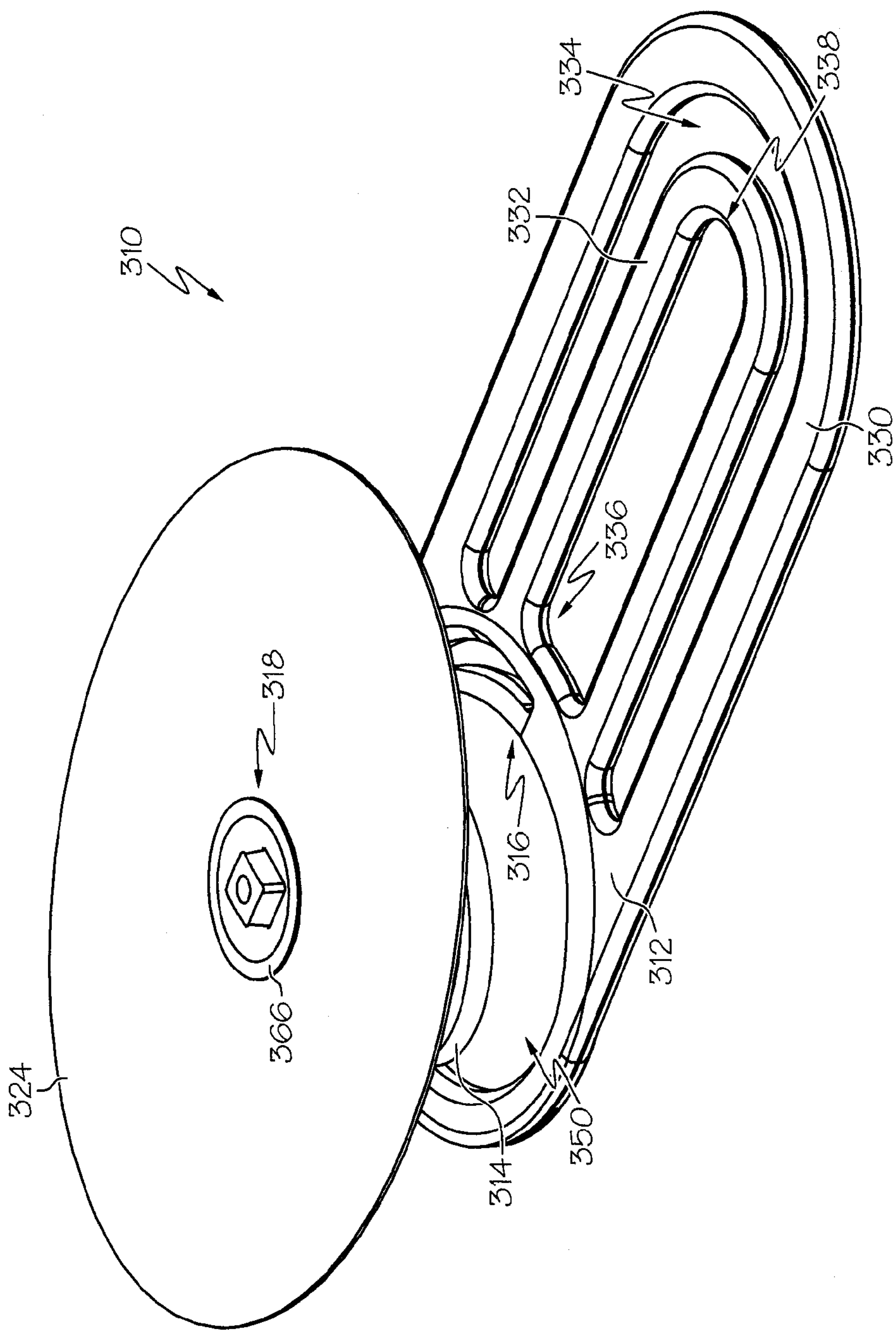
FIG. 17 illustrates an alternate mounting assembly having an alternate first mounting element in accordance with another aspect of the present invention.
Figure 18:
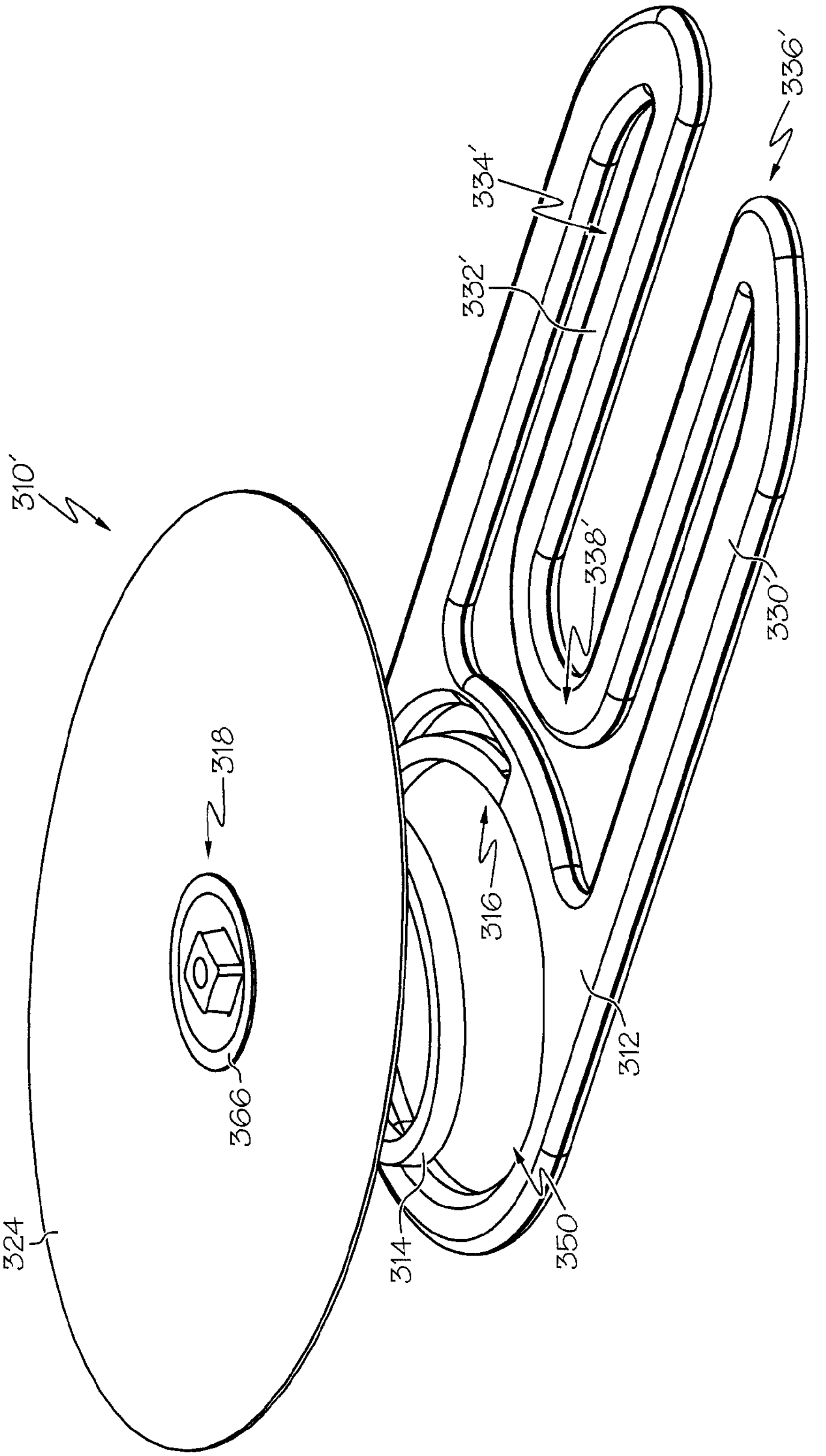
FIG. 18 is similar to FIG. 17, but shows yet another alternate first mounting element in accordance with an aspect of the present invention.

Turning to the shown example of FIG. 1A, a mounting assembly 10 for a wobble head is illustrated in accordance with an aspect of the present invention. The mounting assembly 10 can include a first mounting element 12. The first mounting element 12 can include various geometries and various materials. For example, as shown in FIG. 1A, the first mounting element 12 can include a plate. The plate can have various geometries, such as a generally rectangular geometry shown in FIG. 1A. However, as shown in FIG. 1B, the plate can include various other geometries, such as oval. It is to be appreciated that geometries, such as square, elliptical, circular, triangular, polygonal, etc. can also be employed. Alternatively, as shown in FIGS. 17-18, the first mounting assembly 12 can include a flexible attachment structure, such as a paperclip or the like. For the sake of brevity, the following description will include the plate geometry, with the understanding that it can similarly apply to the various other geometries.

The mounting assembly 10 can also include a resilient spring 14 that can include a first end portion 16 and a second end portion 18. In the shown example, the first end portion 16 of the spring 14 is coupled to the first mounting plate 12. The first mounting plate 12 can include a thin paper, plastic, cardboard, or other plate-like structure, having a first side 20 and second side 22. The first side 20 can be adapted to secure to an object, such as an image or photo (not shown) via a permanent or non-permanent adhesive, or the like. The adhesive can be pre-applied to the first side 20 of the first mounting plate 12 and can include a film or other protective element provided thereon, such as a peel-away backing, which is removed prior to use. However, it is to be appreciated that the object can also be secured to the first mounting plate 12 via a magnet, fastener (e.g., a hook and loop fastener), suction cup, or various other suitable structures and/or methods. Additionally, as shown, the first end 16 of the spring 14 can be coupled to the second side 22 of the first mounting plate 12 at a substantially perpendicular angle, as depicted in FIG. 2B.

The mounting assembly 10 can also include a second mounting element 24 coupled to the second end portion 18 of the spring 14. Like the first mounting element 12, the second mounting element 24 can include various geometries and various materials, such as a plate or even a flexible attachment structure. Again, for the sake of brevity, the following description will include the plate geometry, with the understanding that it can similarly apply to the various other geometries. Additionally, like the first mounting plate 12, the second mounting plate 24 can include an adhesive, fastener, or the like, such that the second mounting plate 24 can be utilized to couple the mounting assembly 10 to a support structure, as will be described more fully herein. In addition or alternatively, either or both of the first and second mounting plates 12, 24 can be attached to a support structure. For example, at least one of the first and second mounting plates 12, 24 can be adapted to be coupled to any regular or irregular surface, such as books, clothing, appliances, computers, office equipment, furniture, vehicles, windows, mirrors, bulletins, wipe boards, postage stamps, greeting cards, envelopes, postcards, corporate mailers, magazines, drink cups, food packaging, and/or various other suitable materials or structures.

Figure 2A:
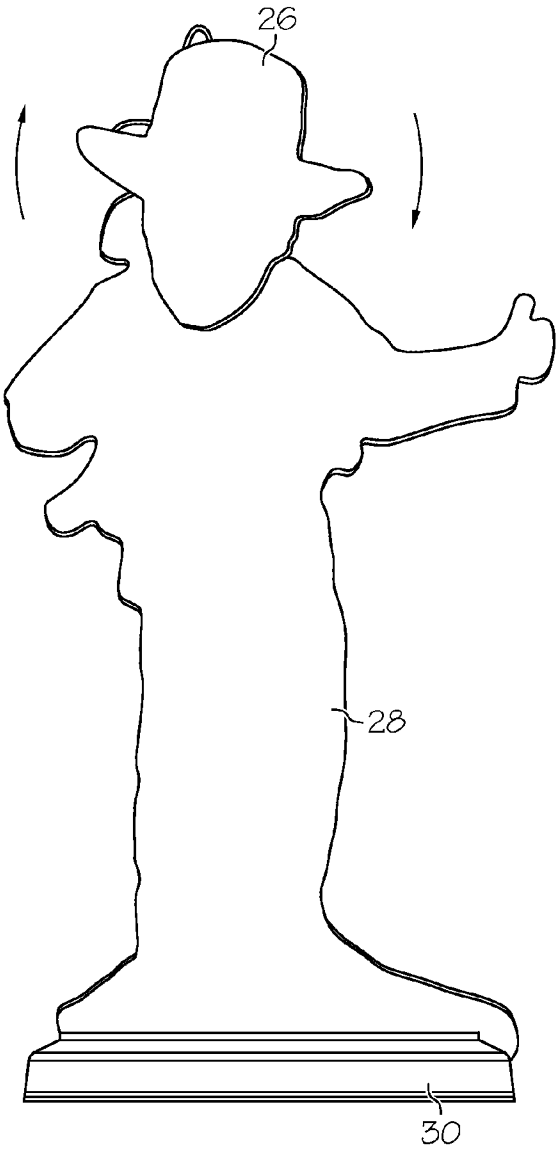
FIG. 2A illustrates a front view of an example application of the mounting assembly of FIG. 1 on a wobble-head figure in accordance with an aspect of the present invention.
Figure 2B:
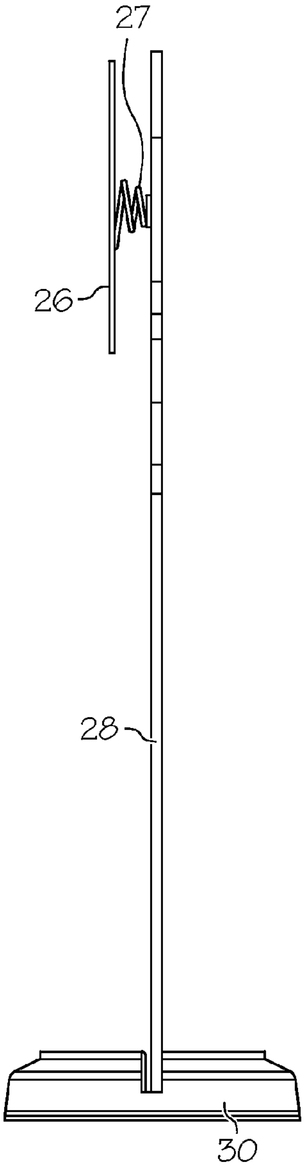
FIG. 2B illustrates a side view of an example application of the mounting assembly of FIG. 1 on a wobble-head figure in accordance with an aspect of the present invention.

Turning now to the examples shown in FIGS. 2-4, the mounting assembly 10 can be employed to support various objects upon various supporting structures. For example, as shown in FIGS. 2A and 2B, the mounting assembly 27 can be used to mount a photograph of a head 26 onto a body 28. The head 26 can be constructed from a high-resolution digital photograph on thick, gloss photo paper or other suitable media. The head 26 can be of a specific person (e.g., oneself, family member, friend, celebrity) or a pet (e.g., dog, cat, etc.). The body 28 can be constructed from pressboard, plastic, metal, wood, or the like, and can include a full color printed image, for example, an athlete (e.g., tennis player, ice skater, skateboarder, cyclist, basketball player), a media personality, an actor/actress, singer, or even an inanimate object, such as a sports car, a motor boat, etc. The body 28 can be supported by a base 30 or the like manufactured from plastic, wood, metal, or other suitable material.

When mounted to the body 28, the head 26 is able to wobble with respect to the body via the spring 14. The wobble movement of the head 26 can depend upon various characteristics of the spring, such as length, material, and coil diameter. In one example, the spring 14 can be a compression spring. Moreover, because the head 26 is mounted substantially perpendicularly with respect to the body 28, the head 26 wobbles in a unique side to side motion, as depicted by the arrows in FIG. 2A, that can last up to thirty seconds or longer when set in motion, though other times can also be achieved. The wobble action of the head 26 can be a clockwise and counterclockwise movement of the head 26 with the spring 14 acting as a pivot point. It is to be appreciated that various items can be animated with the wobble motion. For example, a hand can be attached to the body via the mounting assembly 10 to provide a waving motion. Other examples of items that can be attached via the mounting assembly 10 include a postage stamp, a rotating ball, a food item (e.g., cup of coffee/tea, can of soda/beer, a donut, ice cream, cookie, hot dog, burger), a book, a magazine, flowers, a gift, or a branded product, such as a COKE®, a SNICKERS®, etc. can be attached for advertising purposes. Although wobble heads have been described herein as being attached to a body or background image, it is to be appreciated that a wobble head can be provided with a magnet, suction cup, hook and loop fastener, snaps, rivets, buttons, or any other fastening device to couple the wobble head to clothing, appliances, computers, office equipment, furniture, vehicles, windows, mirrors, bulletins, wipe boards, postage stamps, greeting cards, envelopes, postcards, corporate mailers, magazines, or any other suitable material or structure.

Figure 3A:
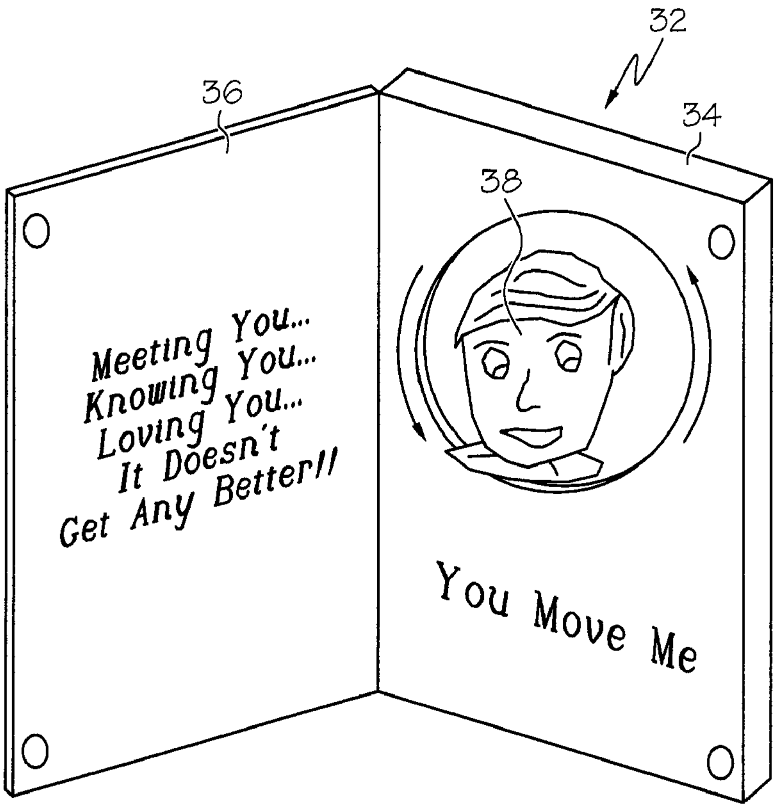
FIG. 3A illustrates another example application of the mounting assembly of FIG. 1 on an example self-mailer wobble image greeting card in accordance with an aspect of the present invention.
Figure 3B:
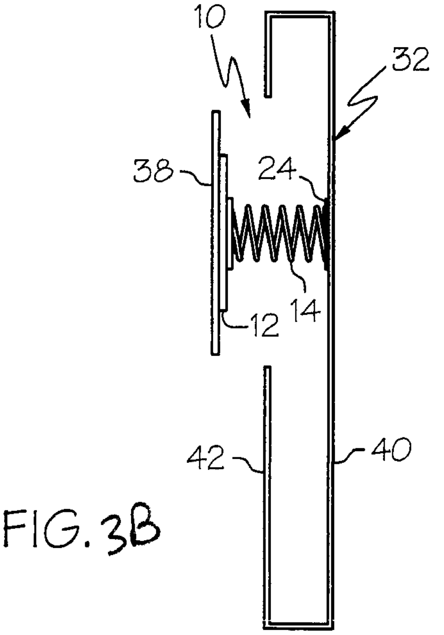
FIG. 3B illustrates a side view of the self-mailer wobble image greeting card of FIG. 3A in accordance with an aspect of the present invention.
Figure 4A:
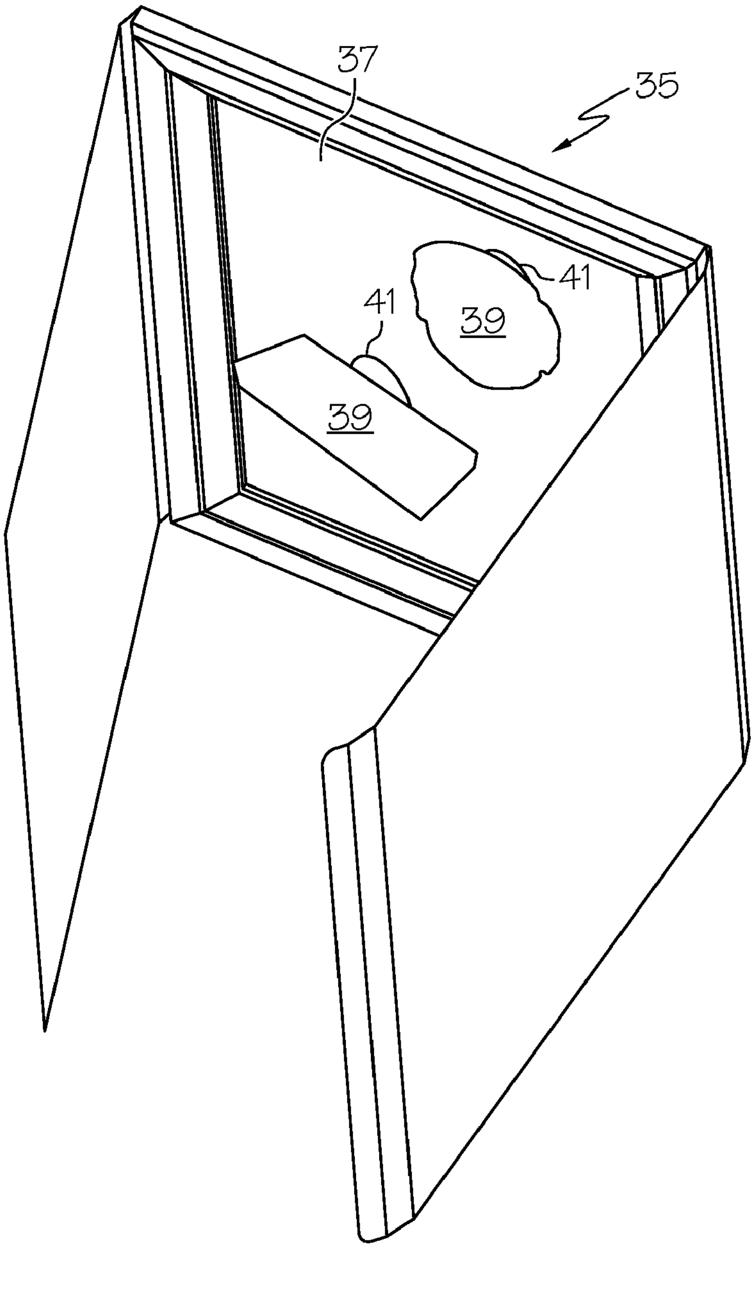
FIG. 4A illustrates another example application of the mounting assembly of FIG. 1 on another self-mailer wobble image greeting card in accordance with an aspect of the present invention.

Turning now to FIGS. 3A-3B, another example application of the mounting assembly 10 is shown with a self-mailer greeting card 32. It is to be appreciated that the description with respect to the self-mailer greeting card can be applied to any other type of suitable mailer. The self-mailer greeting card 32 can include a spacer box 34, and a greeting panel 36. Various fasteners or adhesives, such as hook and loop fasteners or removable adhesive dots can be applied to corners of the spacer box 34 and greeting panel 36 to facilitate holding the greeting card 32 together during mailing. A mailing address can be provided on an outside portion of either the spacer box 34 or the greeting panel 36. A wobble image 38 can be secured to an inner portion of a back panel 40 of the spacer box 34 via mounting assembly 10. As shown, the wobble image 38 is secured to the first mounting plate 12, and the second mounting plate 24 is secured to the back panel 40. The spring 14 is attached therebetween and is shown as a coil spring, though it is to be appreciated that the spring 14 can also include various other geometries, such as a helical spring. A front panel 42 of the spacer box 34 can include a cut out portion such that the spring 14 can project through the front panel 42. The spacer box 34, thus, provides room for suitable compression of the spring 14 while still retaining its original properties. However, where a generally fully collapsible spring is utilized, such as is discussed more fully herein, it is to be appreciated that a greeting card 35 can include a substantially flat base panel 37, as shown in FIG. 4A, instead of the spacer box 34. One or more objects 37, such as a photograph, business card, for example, can be movably attached to the base panel 37 via a mounting assembly 41, the mounting assembly 41 being substantially similar to that described with respect to FIG. 1 herein.

The spacer box 34 can also provide room for various other features, such as one or more microchips, speakers, batteries, or the like (not shown). For example, the microchip can be coupled to the mounting assembly 10, such as by being secured to an end portion of the spring 14. For instance, an adhesive, or the like, can be utilized to secure the microchip to any desirable surface. The microchip can be operable to provide voice activation and audio for an image secured to the mounting assembly 10. Though described in accordance with a greeting card, it is to be appreciated that the microchip could be utilized with various other applications of the mounting assembly 10.

Figure 4B:
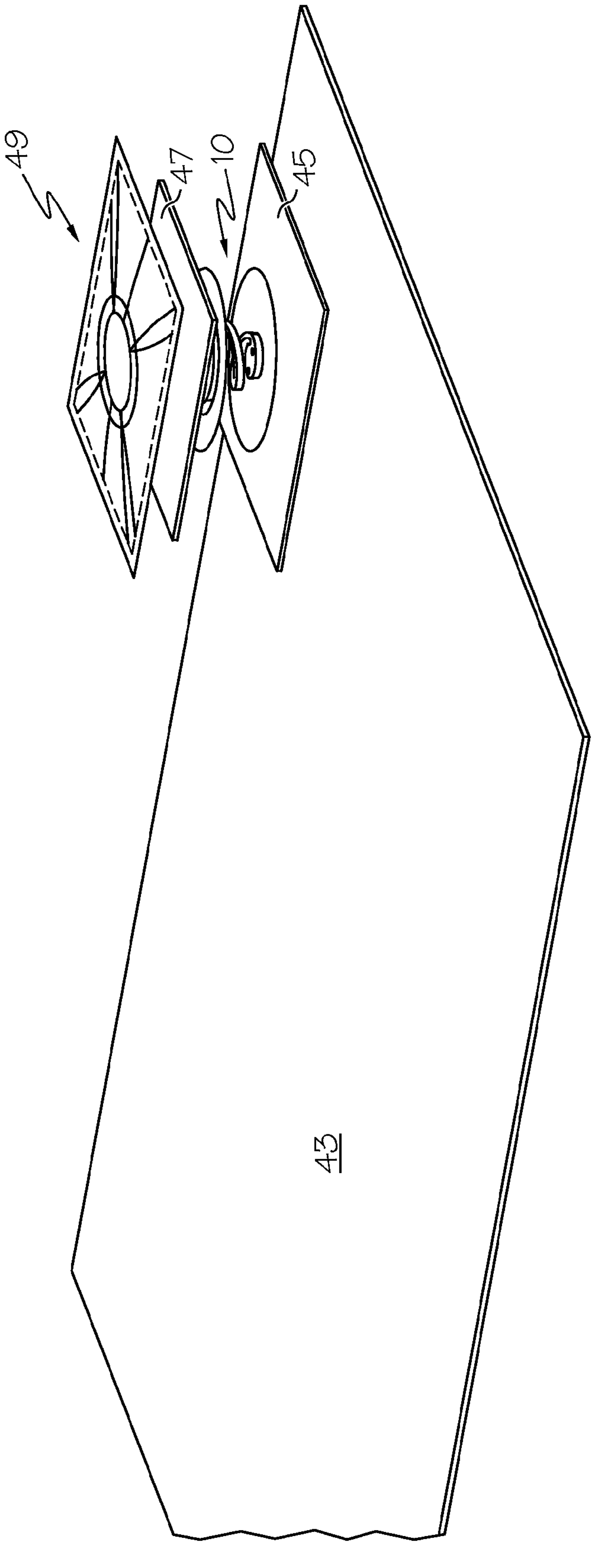
FIG. 4B illustrates another example application of the mounting assembly of FIG. 1 in accordance with an aspect of the present invention.

Turning to FIG. 4B, it is to be appreciated that the mounting assembly 10 can be compressed to a substantially flat geometry, as is discussed in greater detail herein, and can be utilized to attach one or more objects to any suitable item 43. The item 43 can include a greeting card, an envelope, a postcard, a corporate mailer, a magazine, a drink cup, food packaging, or the like. As shown in the present example, a plurality of objects 45, 47, 49 can be coupled to the item 43. The object(s) 45, 47, 49 can include a preprinted image, a custom image, a photograph, a postage stamp, and/or the like. Further, one or more objects can be positioned between the mounting assembly 10 and the item 43; while one or more other objects can be positioned on an opposite side of the mounting assembly. One of these objects can include a protective cover, which will be described in greater detail herein.

Figure 4C:
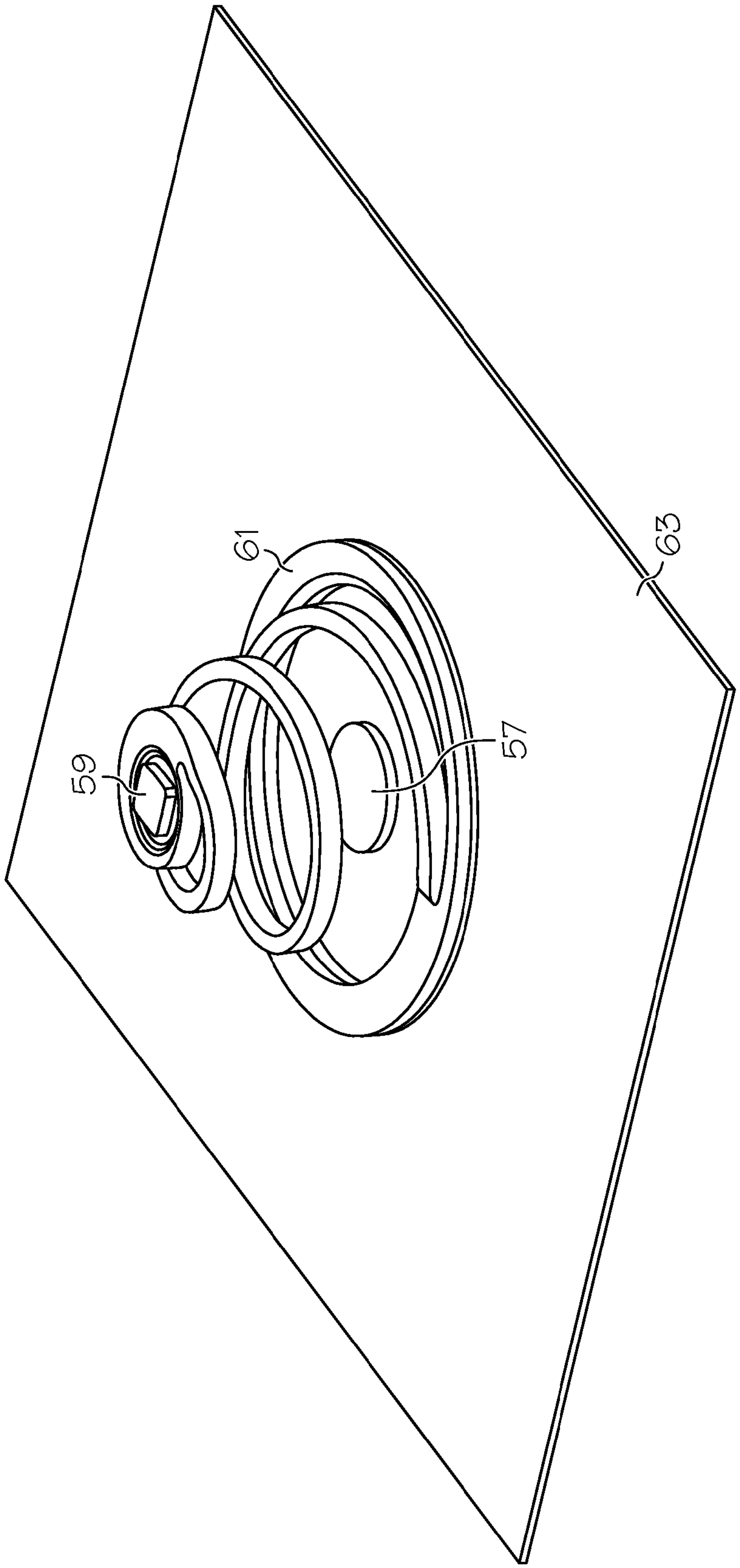
FIG. 4C illustrates another example application of the mounting assembly of FIG. 1 in accordance with an aspect of the present invention.

FIG. 4C illustrates an adhesive 57 for securing the spring 61 in a flattened position in accordance with an aspect of the present invention. For instance, the adhesive can be a captive glue dot 57 utilized to capture the spring 61 via a top portion 59 of the spring 61. The spring can then be trapped onto a surface 63 until the product is ready to be activated. For instance, the glue dot 57 can be applied to a magazine insert. The spring 61 can be held down by the glue dot 57 until a reader pulls on an image secured to a top of the spring 61, which would then pop up and start wiggling. The glue can be the same type used in the industry to hold down items such as credit cards, CD's, and such to mailers and envelopes. However, any suitable adhesive can be used in any suitable form and is contemplated as falling within the scope of the present invention. As can be appreciated, the mounting assembly 10 can be utilized to support various objects upon various supporting surfaces, and as such the various examples shown in FIGS. 2-4 are not intended to provide any limitations upon the present invention.

Figure 5:
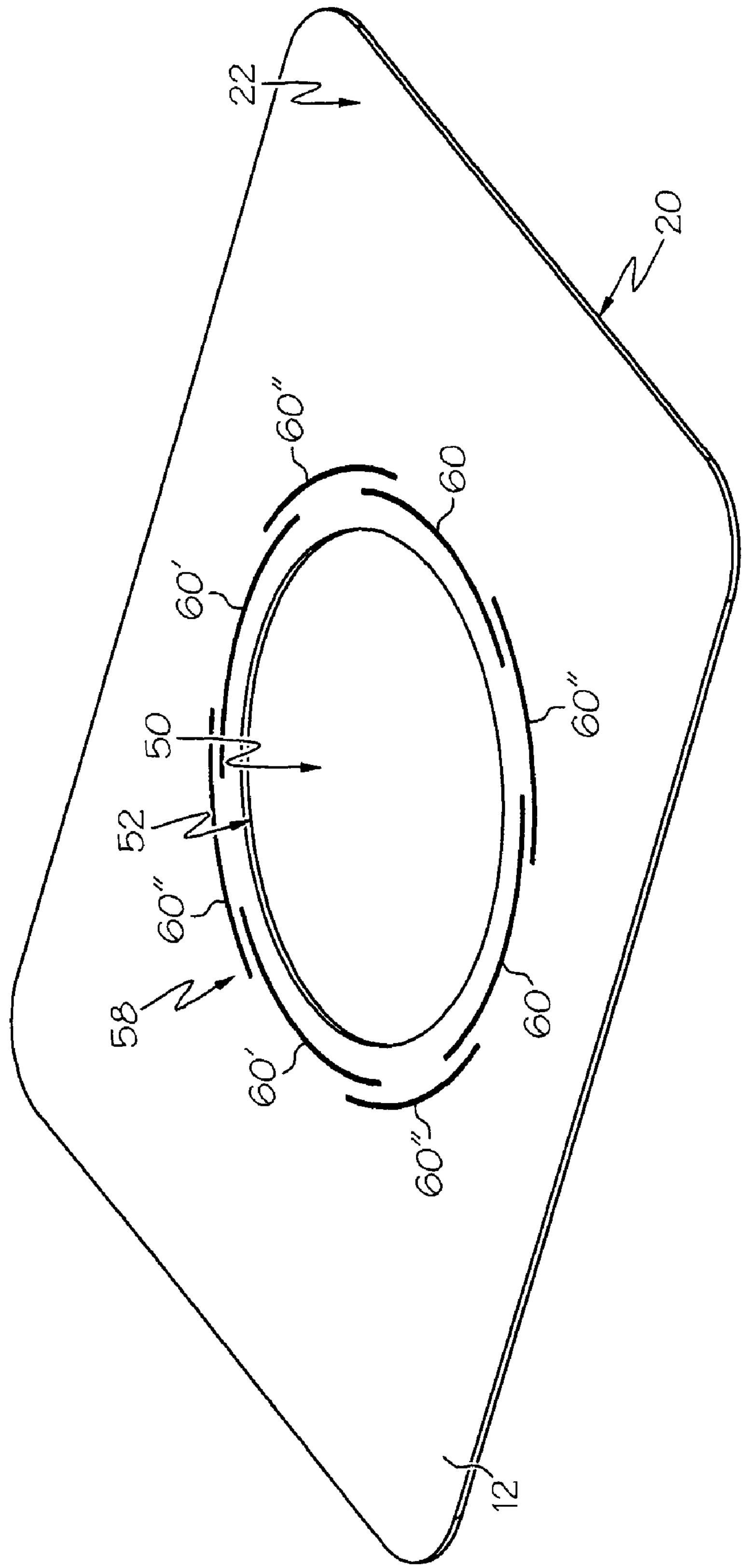
FIG. 5 illustrates a perspective view of an example first mounting element in accordance with an aspect of the present invention.
Figure 6:
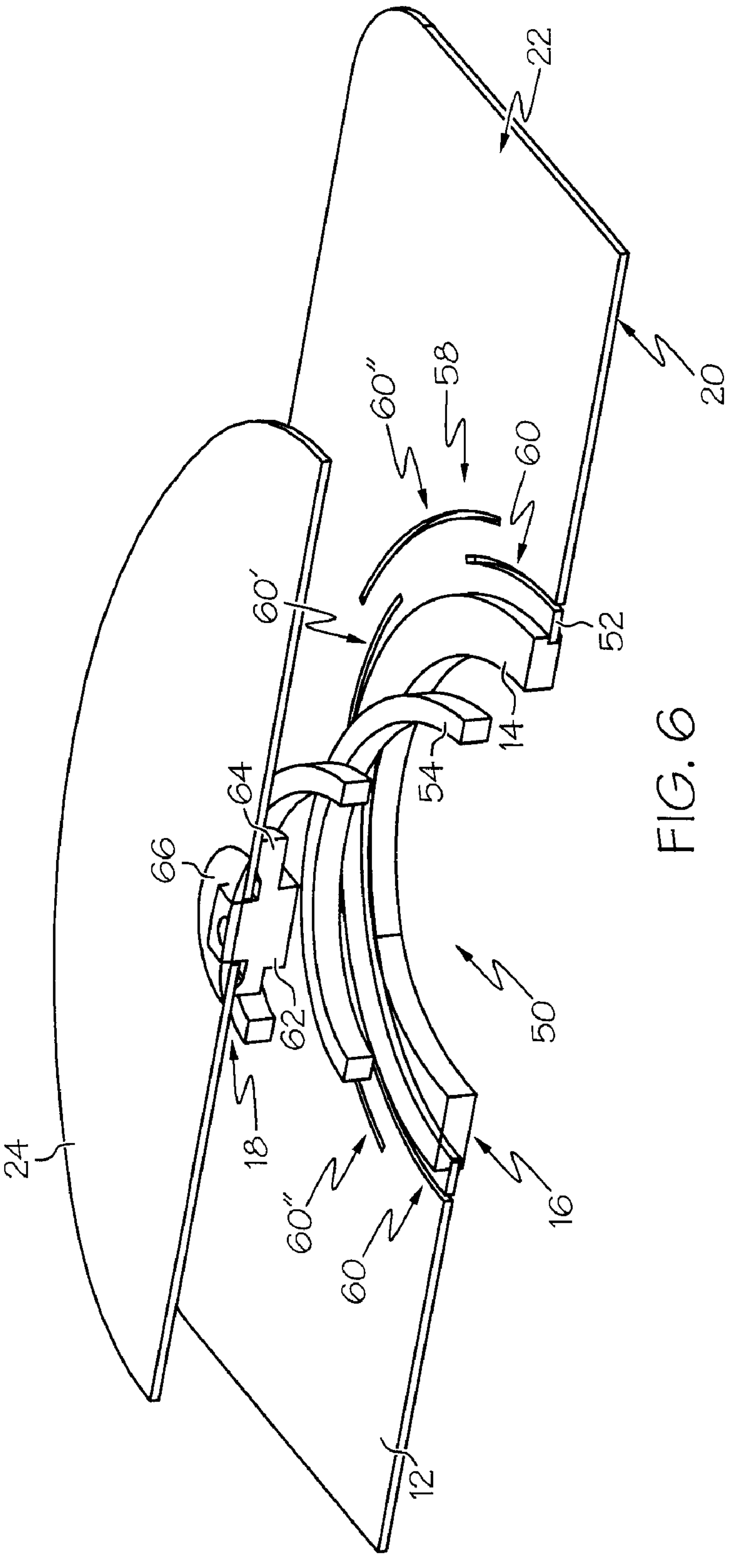
FIG. 6 illustrates a perspective section view along line 6-6 of FIG. 1 of the example mounting assembly in accordance with an aspect of the present invention.

Turning now to FIGS. 5-7, the various elements of the mounting assembly 10 of FIG. 1A will now be discussed in more detail. The first mounting plate 12 can include an aperture 50 defined by a peripheral edge 52. As shown in FIG. 5, the aperture 50 can include a hole extending through the first mounting plate 12, though it can also include a recess or the like that does not extend through the plate. The peripheral edge 52 can extend about the entire edge of the aperture 50. For example, where the aperture 50 includes a circular hole, the peripheral edge 52 can extend about the circumference of the hole. However, it is to be appreciated that either or both of the aperture 50 and peripheral edge 52 can also include various other geometries, such as square, oval, triangular, polygonal, etc.

As shown in FIG. 6, the resilient spring 14 can be attached to the first mounting plate 12. For example, the first end 16 of the spring 14 can be attached to at least a portion of the peripheral edge 52 of the aperture 50. The spring 14 can be attached in various manners. For example, the spring 14 can be attached using various fasteners, adhesives, or the like. In another example, as shown, the spring 14 can be molded directly to the first mounting plate 12. That is, during a single manufacturing step where the spring 14 is actually formed, the spring 14 can also be simultaneously attached to (e.g., molded to) the first mounting plate 12. As shown, the spring 14 can be molded directly to the peripheral edge 52 of the aperture 50 such that portions of the first end 16 of the spring 14 extend from either or both of the first and second sides 20, 22 of the first mounting plate 12. The spring 14 can be molded to the peripheral edge 52 radially, as shown, or even tangentially along various planes. Alternatively, the spring 14 can fill in the aperture 50, or as shown, provide for a hole through the plate.

Additionally, as shown in FIGS. 1 and 6, remainder of the spring 14 can also be formed during the molding process. In one example, the molding process can include an injection molding process utilizing a thermoplastic material or the like, such as acetyl. It is to be appreciated that various materials can be used, along with various geometries, depending upon the desired performance characteristics of the spring 14. As shown, the spring 14 can include a helical geometry. In addition or alternatively, the spring 14 can include a plurality of coils 54 arranged in a conical geometry 56. That is, the outer diameter of the coils 54 can decrease from the first end 16 to the second end 18. The coils 54 can decrease in diameter at varying degrees, and/or can even taper from the first end 16 to the second end 18. Further, it is to be appreciated that the coils can have various cross-sectional geometries, such as square, circular, triangular, polygonal, etc.

Figure 7A:
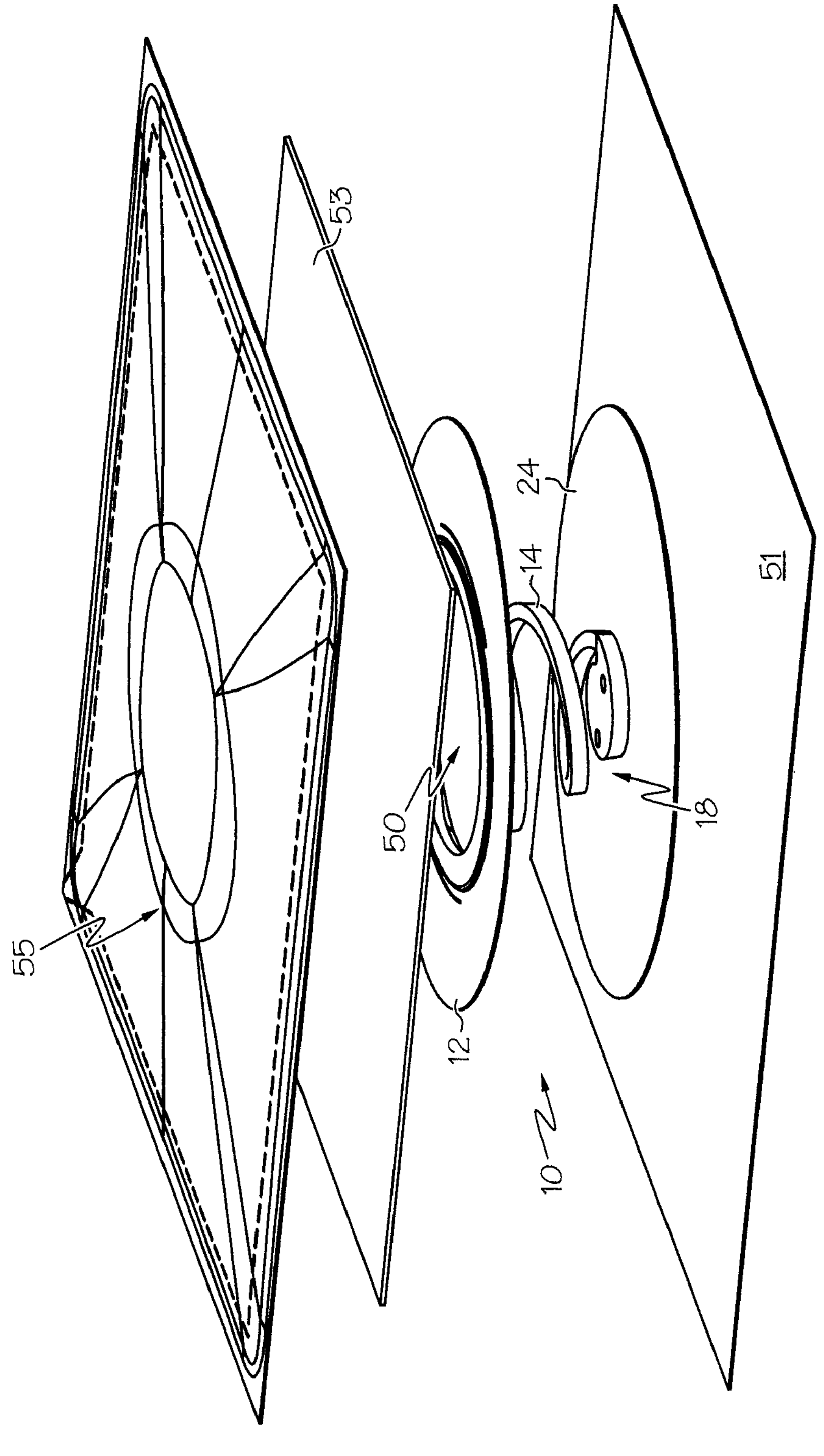
FIG. 7A illustrates another example application of the mounting assembly of FIG. 1 for use with a postage stamp in a first configuration in accordance with an aspect of the present invention.
Figure 7B:
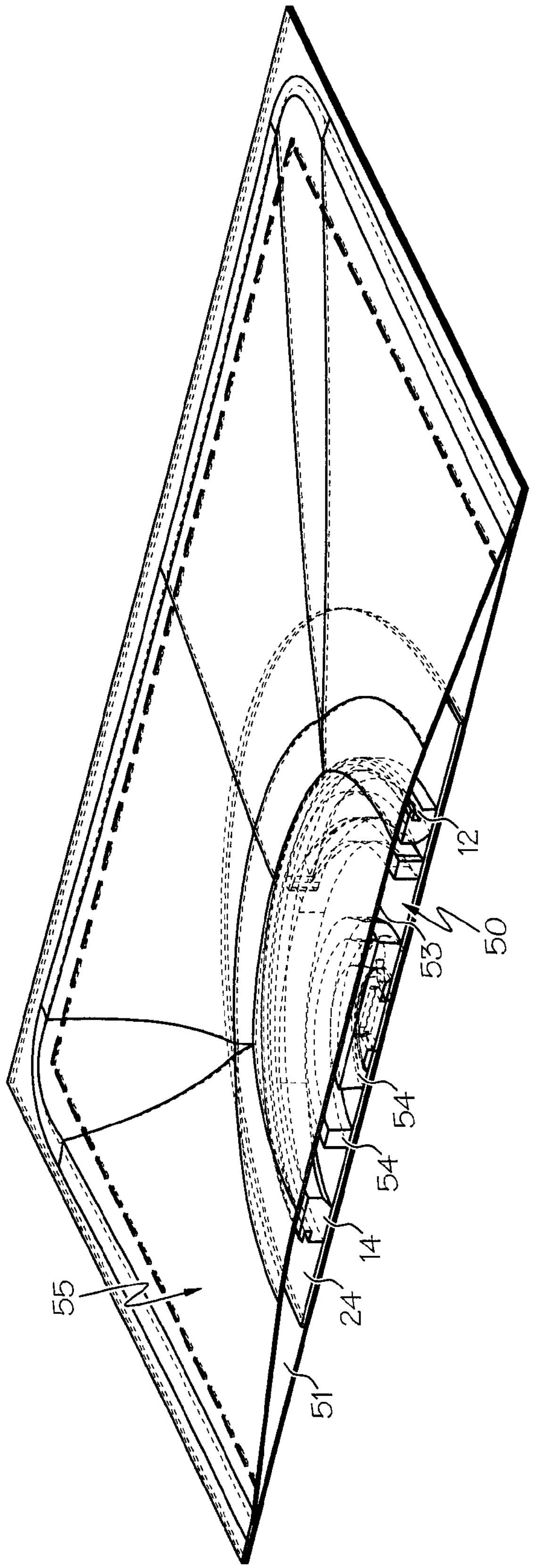
FIG. 7B is similar to FIG. 7A, but illustrates a sectional view the example application in a second configuration in accordance with an aspect of the present invention.

Additionally, as shown in FIGS. 7A-7B, the conical geometry 56 can permit the spring 14 to collapse to a substantially flat geometry. For example, as shown in FIG. 7A, the mounting assembly 10 can be attached between a supporting structure 51, such as a greeting card, envelope, postcard, corporate mailer, magazine, or the like, and an object 53, such as a postage stamp. The supporting structure 51 can also be a carrier sheet used to carry the mounting assembly and/or to transfer the mounting assembly 10 to another structure. The carrier sheet can include an adhesive backing, such as a permanent, removable, or repositionable adhesive layer. A protective cover 55, such as a removable, light permeable protective film, can be placed in covering relationship over the object 53 and mounting assembly 10 to create a layered assembly. The protective cover 55 can include a permanent, a removable, or a repositionable adhesive layer. Accordingly, the protective cover 55 can be removed from the object 53 without damaging the object 53. The protective cover 55 can be manufactured from paper, film, plastic, cardboard, or various other suitable materials. Further, the protective cover 55 can be substantially transparent, semitransparent, or opaque. It is to be appreciated that although a single protective cover 55 has been described, various numbers of layers can be arranged variously about the mounting assembly 10.

Next, as shown in FIG. 7B, the spring 14 can collapse such that the coils 54 are received within the aperture 50 and lie generally along a single plane. For example, each coil 54 can be received within the aperture 50 adjacent the other coils 54 such that the spring 14 has a vertical height that is substantially equal to or less than the vertical height of the first end 16 that is molded to the first mounting plate 12. Thus, the interaction of the conical geometry 56 and the aperture 50 can permit the mounting assembly 10 to be compressed to a substantially flat geometry. Further, the protective cover 55 can act to retain the mounting assembly 10 in the compressed state until removed. Accordingly, the mounting assembly 10 can be utilized in various applications requiring a relatively thin assembly, such as with a postage stamp on an item to be mailed, or even with a book, magazine, greeting card, etc., yet still retain the wobble ability when released.

The first mounting plate 12 can include various other features to facilitate molding the spring 14 thereto. As shown in FIGS. 5-6, the first mounting plate 12 can include a stress relief structure 58 to counter-act cooling or shrinking forces that may occur during the cooling and curing of the spring 14. For example, as the spring 14 is molded to the peripheral edge 52 and subsequently cures from a liquid state to a solid state, it can contract towards the interior of the aperture 50. If no stress relief structure is provided, the first mounting plate 12 can be deformed to a curved shape, such as a "potato chip" shape. However, the stress relief structure 58 can counter-act such a deformation by permitting limited movement of portions of the first mounting plate 12 to absorb the cooling or shrinking forces.

The stress relief structure 58 can include various geometries, such as at least one slit extending through the first mounting plate 12. In the shown examples, the stress relief structure 58 can include an arcuate slit 60 generally similar to the curvature of the peripheral edge 52. Alternatively, the stress relief structure 58 can include a plurality of arcuate slits 60, and at least one of the slits 60 can be generally concentric with another of the slits 60'. For example, the stress relief structure 58 can include a pair of slits 60, each being disposed on an opposite side of the aperture 50. In addition or alternatively, the plurality of arcuate slits 60 can include at least one of the slits 60 being radially offset from another of the arcuate slits 60''. Further still, the plurality of arcuate slits 60 can include concentric and radially offset slits arranged in a pattern or array. For example, as shown in FIG. 5, the slits 60 can be arranged to generally circumscribe the peripheral edge 52 to provide stress relief along the entire first end 16 of the molded spring 14. It is to be appreciated that the stress relief structure 58 can also include various other geometries, arrangements, etc. For example, the stress relief structure 58 can include grooves, holes, or the like that may or may not extend through the first mounting plate 12. Additionally, the stress relief structure 58 can be disposed at various locations about the first mounting plate 12. In addition or alternatively, the stress relief structure 58 can be arranged in various patterns, arrays, or even randomly, and can be arranged in various linear or curved geometries. Even further still, the stress relief structure 58 can include structure added to the first mounting plate, such as a varying thickness of the first mounting plate 12, a stress-resistant frame extending about the first mounting plate 12, or the like.

Keeping with FIGS. 5-6, the second end 18 of the spring 14 can be attached to the second mounting plate 24 in various manners. In one example, the second end 18 can be molded directly to the second mounting plate 24 similar to the operation previously described with regards to the first end 16 and the first mounting plate 12. Alternatively, the second end 18 can be attached to the second mounting plate 24 by way of an adhesive, a fastener, welding or the like. In the shown examples, the second end 18 can be attached to the second mounting plate 24 by a thermoforming operation, such as by a heat-staking operation. In a heat-staking operation, the second mounting plate 24 can be placed adjacent the second end 18 of the spring. A stake 62 can be inserted through a hole or the like in the second end 18 of the spring 14 until a flange 64 of the stake 62 abuts the spring 14. A tip 66 of the stake 62 can extend through the second mounting plate 18. Subsequently, the tip 66 of the stake 62 can be melted (e.g., thermoformed) to thereby trap the second mounting plate 24 between the flange 62 and the melted tip 66. However, it is to be appreciated that various other staking operations can also be used, such as cold staking, riveting, etc.

An example method of manufacturing the mounting assembly 10 will now be discussed. As can be appreciated, the mounting assemblies 10 can be manufactured using various methodologies, including more or less steps arranged in various orders. Additionally, the mounting assemblies 10 can be manufactured by hand (e.g., in singular units or in small batches), or can be manufactured by a semi or fully automated process (e.g., mass production). Though each mounting assembly 10 can be produced individually, it can be beneficial to manufacture a plurality in a single manufacturing process. Thus, for the sake of brevity, the following examples will discuss only the manufacture of a plurality of mounting assemblies 10, with the understanding that such methodologies can apply equally as well to the manufacture of a single mounting assembly 10.

Figure 8:
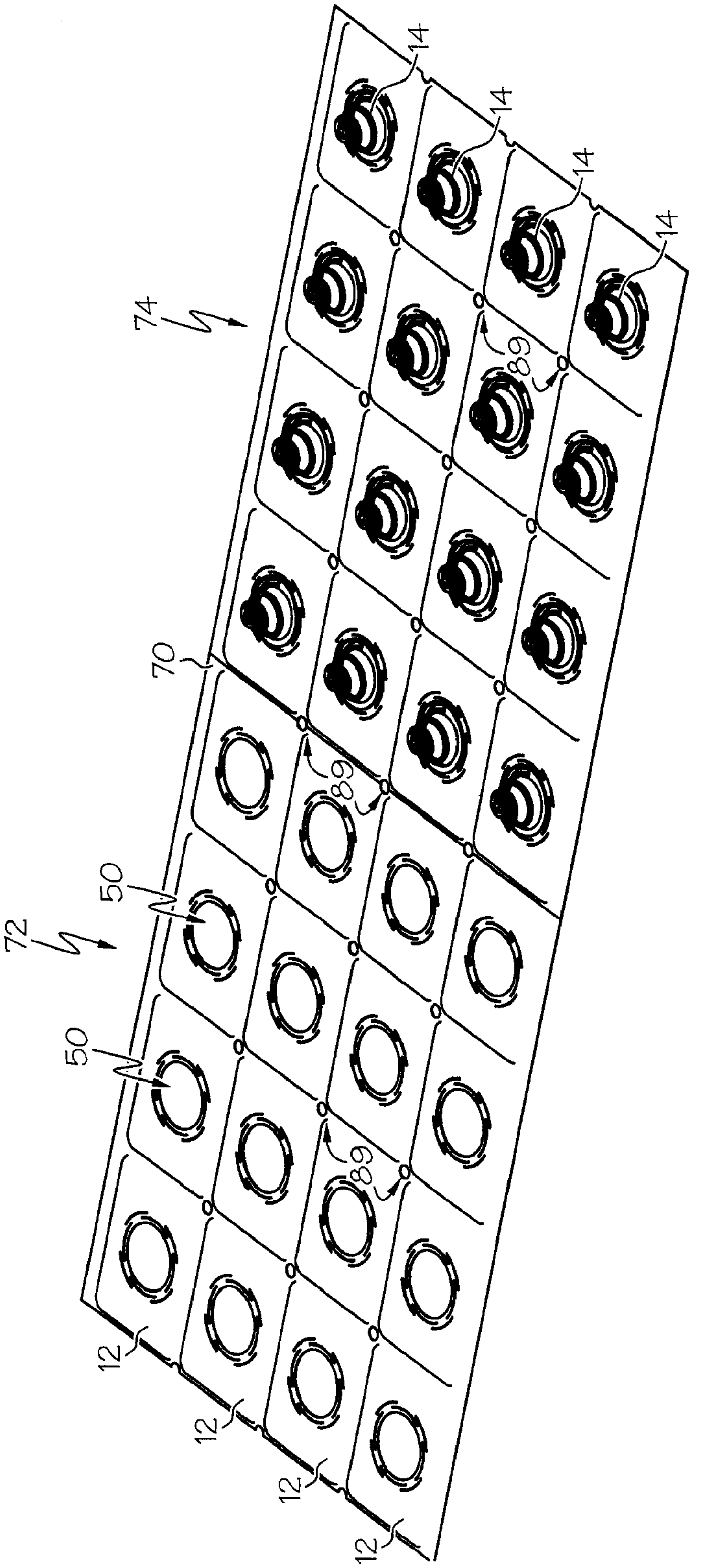
FIG. 8 illustrates a step in an example manufacturing process wherein a plurality of springs are molded onto a plurality of first mounting elements in accordance with another aspect of the present invention.

Turning to the example shown in FIG. 8, a plurality of first mounting plates 72 are provided as a first sheet 70 of material. The first sheet 70 of material can be provided as a discrete sheet, or can also be provided as a continuous sheet of material for use in a reel-to-reel operation, as will be discussed more fully herein. The first sheet 70 can include the same material as the final first mounting plates 12. Thus, for example, the first sheet 70 can be pre-printed with indicia, such as branding information, instructions, or the like, and can also include an adhesive or the like already applied with a protective cover sheet. Additionally, each of the various first mounting plates 12 can be partially pre-cut or otherwise partially separated from the first sheet 70. For example, each of the first mounting plates 72 of FIG. 8 can be perforated about the outer edges thereof to facilitate future removal of the first mounting plates from the first sheet 70.

Next, the plurality of mounting plates 72 of the first sheet 70 can be fed into a molding machine, and a resilient spring 14 can be molded to each of the mounting plates 74. As discussed above, the resilient spring 14 can each be molded directly to each of the mounting plates 74, such as about the peripheral edge 52 thereof. As can be appreciated, the molding machine (not shown) can include the requisite elements necessary to form a spring 14 such as those discussed herein, including an appropriate mold and/or material supply elements for forming the spring geometry. Additionally, each resilient spring 14 can be molded using various operations, such as an injection molding operation using a thermoplastic material or the like. However, other molding operations can be used, such as blow molding, compression molding, rotational molding, vacuum forming, or the like. Further, during the molding operation, each resilient spring 14 can be simultaneously formed as a spring, and attached to the first mounting plate 12 in a single operation.

Next, once the resilient springs 14 have cured to a solid form, the second mounting plates 24 can be attached to form each mounting assembly 10. The second mounting plates 24 can also be provided as a second sheet 80 of material. As before, the second sheet 80 of material can be provided as a discrete sheet, or as a continuous sheet for use in a reel-to-reel operation. Additionally, the second sheet 80 can be pre-printed with indicia, such as branding information, instructions, or the like, can include an adhesive or the like already applied with a protective cover sheet, and/or have the second mounting plates 24 be partially pre-cut or otherwise partially separated from the second sheet 80. Additionally, as shown, the second sheet 80 can carry the stakes 62 used to mount the second mounting plates 24 to the springs 14. For example, the stakes 62 can be removably attached to each of the second mounting plates 24 during in a previous step. Alternatively, the stakes 62 can be provided prior to the heat-staking operation.

Figure 9:
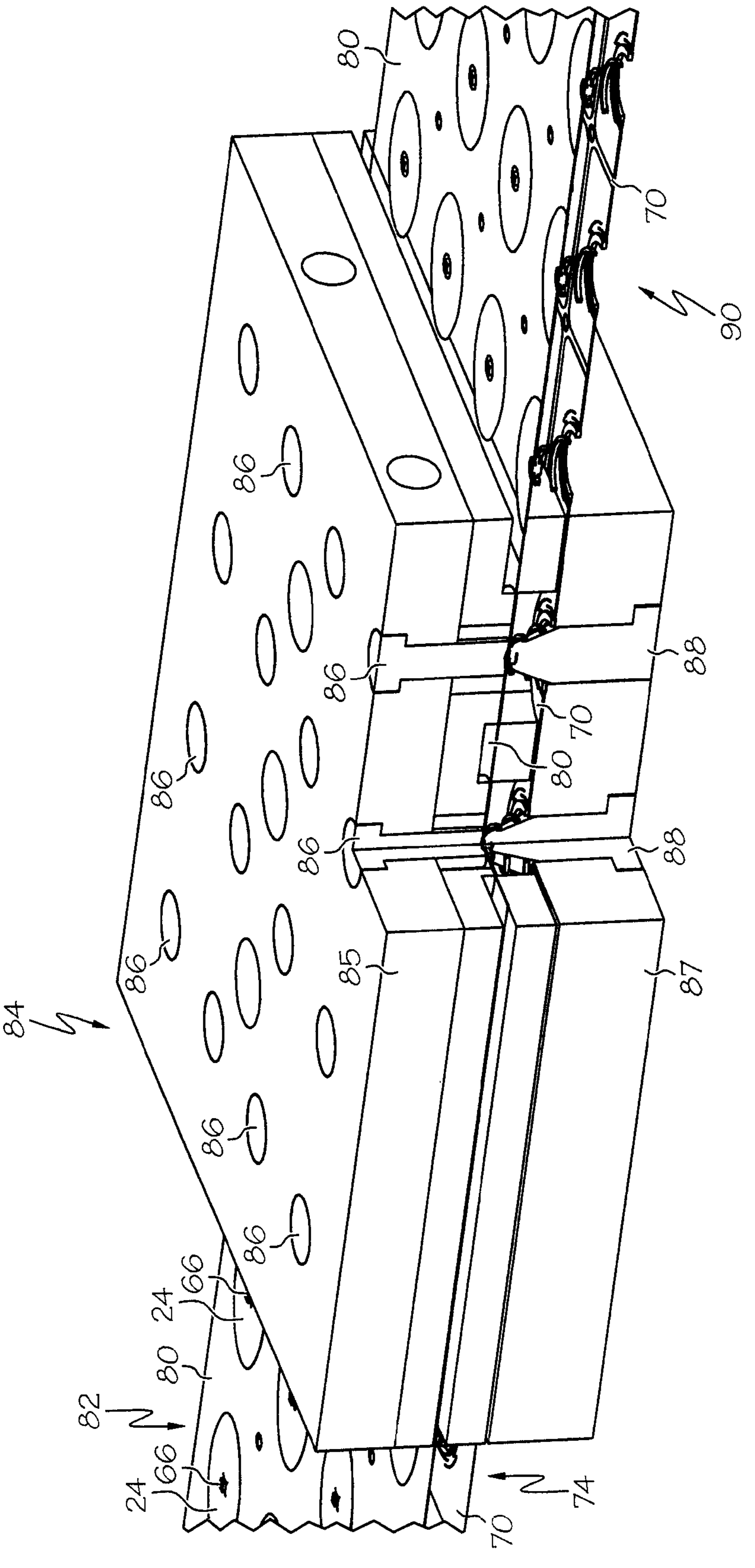
FIG. 9 illustrates another step in the example manufacturing process wherein the second mounting elements are attached to the resilient springs in accordance with an aspect of the present invention.
Figure 10A:
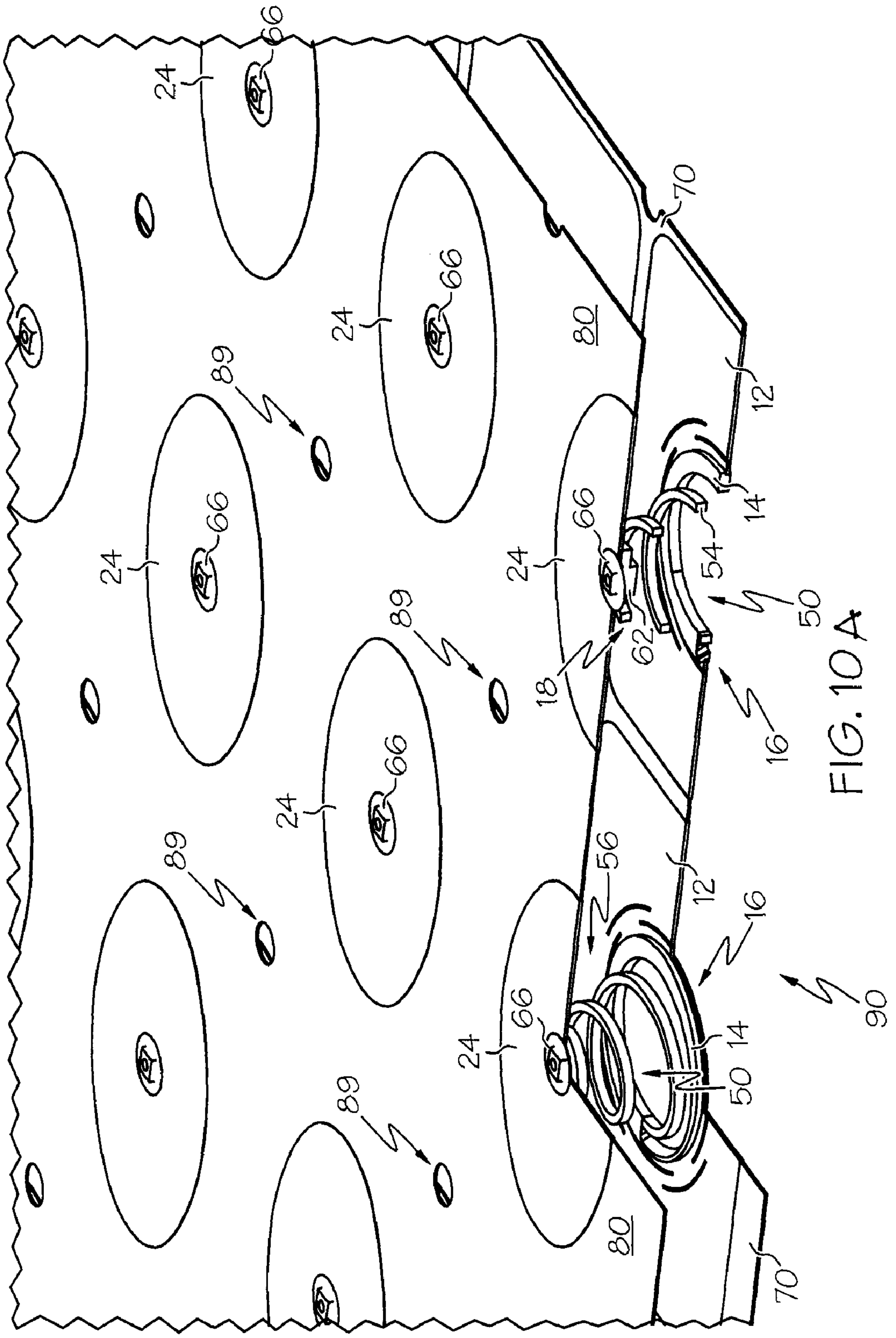
FIG. 10A illustrates a sectional view showing the second mounting elements attached to the resilient springs in accordance with an aspect of the present invention.
Figure 10B:
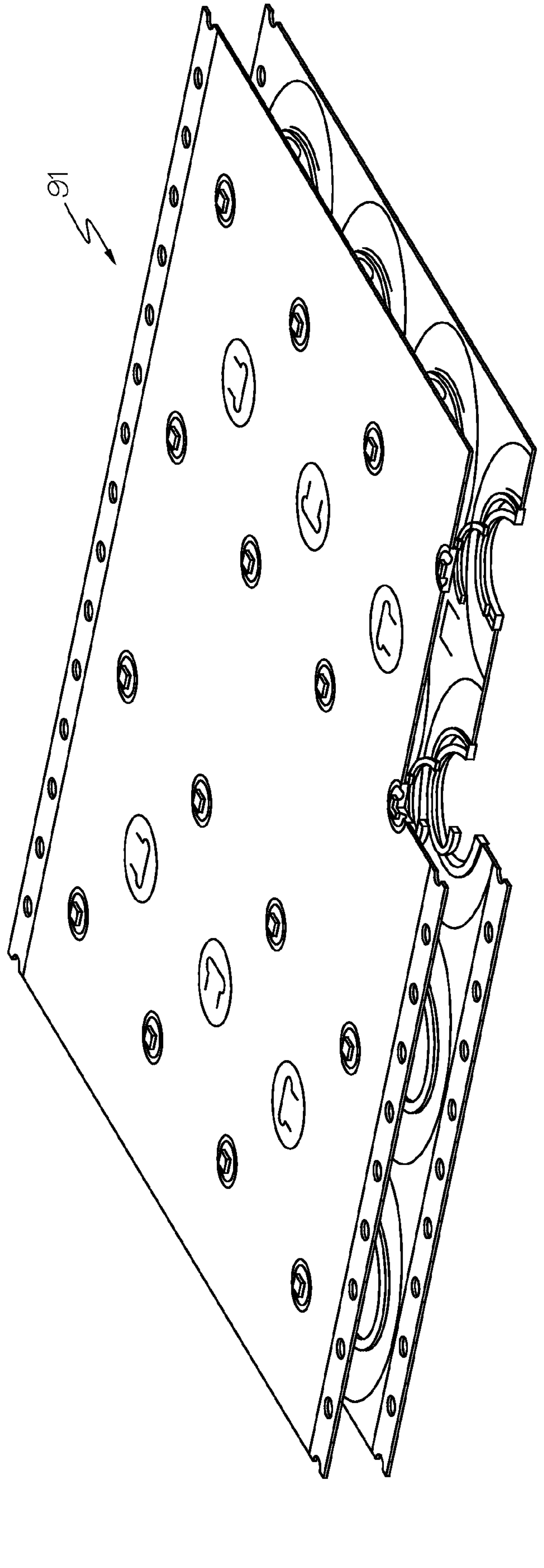
FIG. 10B illustrates a sectional view showing the second mounting elements attached to the resilient springs in accordance with another aspect of the present invention.

Turning to the example shown in FIG. 9, both of the first and second sheets 70, 80 can be fed, in various manners, into an attachment device 84 for manual or automated attachment of the springs 14 to the second mounting plates 24. For example, as shown in FIG. 10A, the sheets 70, 80 can include a plurality of feed holes 89 configured to guide and move the sheets 70, 80 into and out of the attachment device 84. Thus, the feed holes 89 can act as positioning and/or locating features for the sheets 70, 80. FIG. 10B illustrates alternative or additional locations for feed holes 91. As shown, the feed holes 91 are positioned along two opposing sides of each of the sheets 70 and 80. Returning to FIG. 9, the attachment device 84 can include an upper portion 85 having a plurality of upper plungers 86, and a lower portion 87 having a plurality of lower plungers 88. The upper and lower plungers 86, 88 can be arranged in a pattern or array corresponding to the pattern or array of first and second mounting plates 12, 24. The upper and lower portions 85, 87 can be separable to permit the first and second sheets 70, 80 to travel therethrough. Additionally, either or both of the upper and lower plungers 86, 88 can be individually vertically movable. During a heat-staking operation, each lower plunger 88 can act as an orientation guide to expand an associated spring 14 and retain it in a predetermined location. Next, each upper plunger 86 can press against and apply heat to the tip 66 of each stake 62 to thermoform each of the tips 66 against an associated second mounting plate 24. However, as discussed herein, the upper plunger 86 can also perform various other attachment operations, such as cold-staking, riveting, providing various fasteners, adhesives, welding operations, etc. Either or both of the upper and lower plungers 86, 88 can also perform various other steps as may be required.

Subsequent to the heat staking operation, the first and second sheets 70, 80 having a plurality of completed mounting assemblies 90 can be removed from the attachment device 84. Any or all of the upper and lower portions 85, 87 and/or the upper and lower plungers 86, 88 can be vertically separated to permit the sheets 70, 80 to be removed. As shown in FIGS. 9-10, the first and second mounting plates 12, 24 can each remain attached to the first and second sheets 70, 80, respectively, upon exiting from the attachment device 84.

Figure 11:
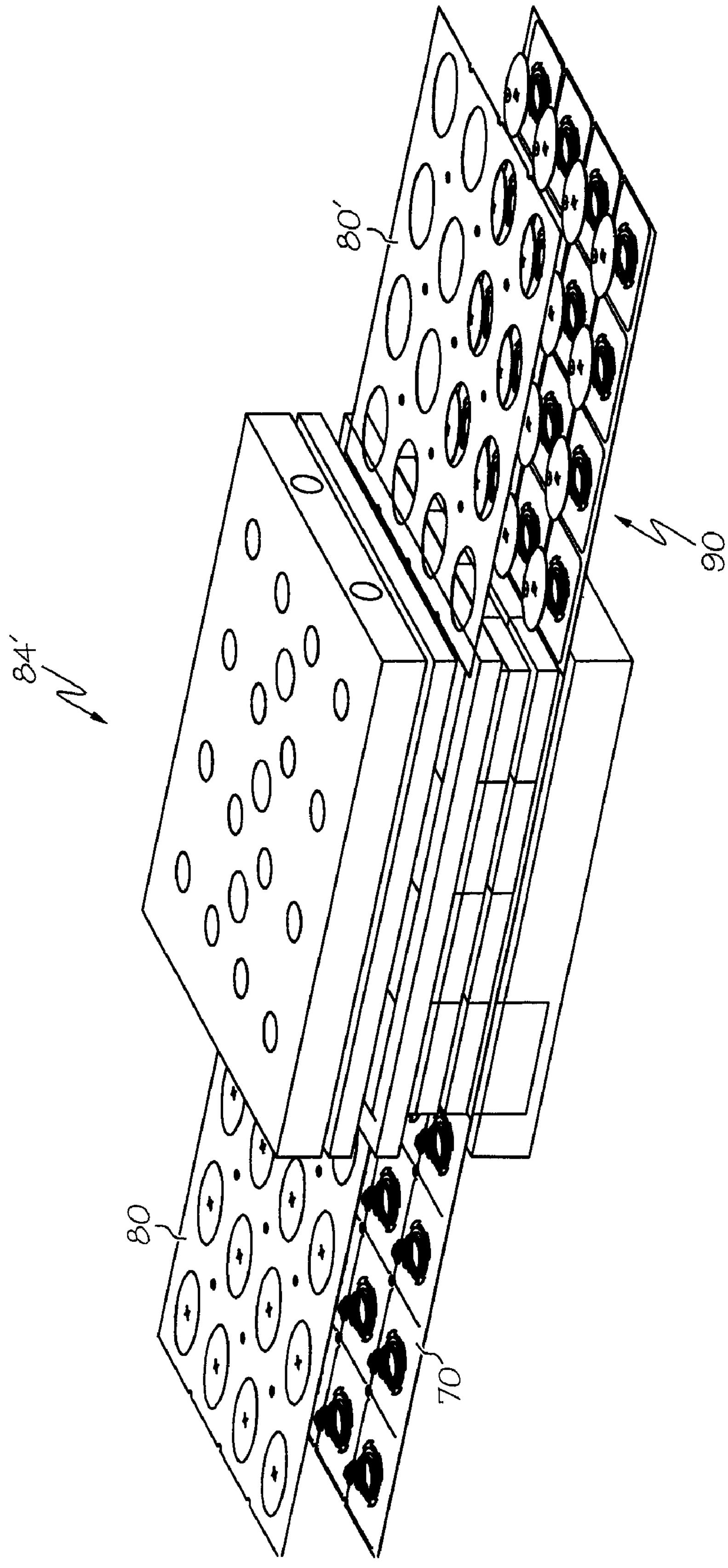
FIG. 11 illustrates another step in the example manufacturing process wherein the second mounting elements are detached from the second sheet in accordance with an aspect of the present invention.

However, either or both of the first and second mounting plates 12, 24 can also be detached from the first and second sheets 70, 80, respectively, by the attachment device 84. For example, as shown in FIG. 11, an alternate attachment device 84' can perform both of the tasks of attaching the second mounting plates 24 to the springs 14, and separating the second mounting plates 24 from the second sheet 80. In one example, the alternative attachment device 84' can utilize a die cutting operation or the like to separate the second mounting plates 24 from the second sheet 80. For example, the upper plunger 86 could cooperate with a die-cutter device (not shown) such that both operations occur substantially simultaneously. However, the operations can also occur in successive order, as well. Thus, once the second mounting plate 24 is separated from the second sheet 80, the completed mounting assemblies 90 and an empty second sheet 80' can exit the alternate attachment device 84'. As can be appreciated, the second mounting plates 24 can also be separated from the second sheet 80 in a manual operation or the like after exiting from the attachment device 84.

Figure 12:
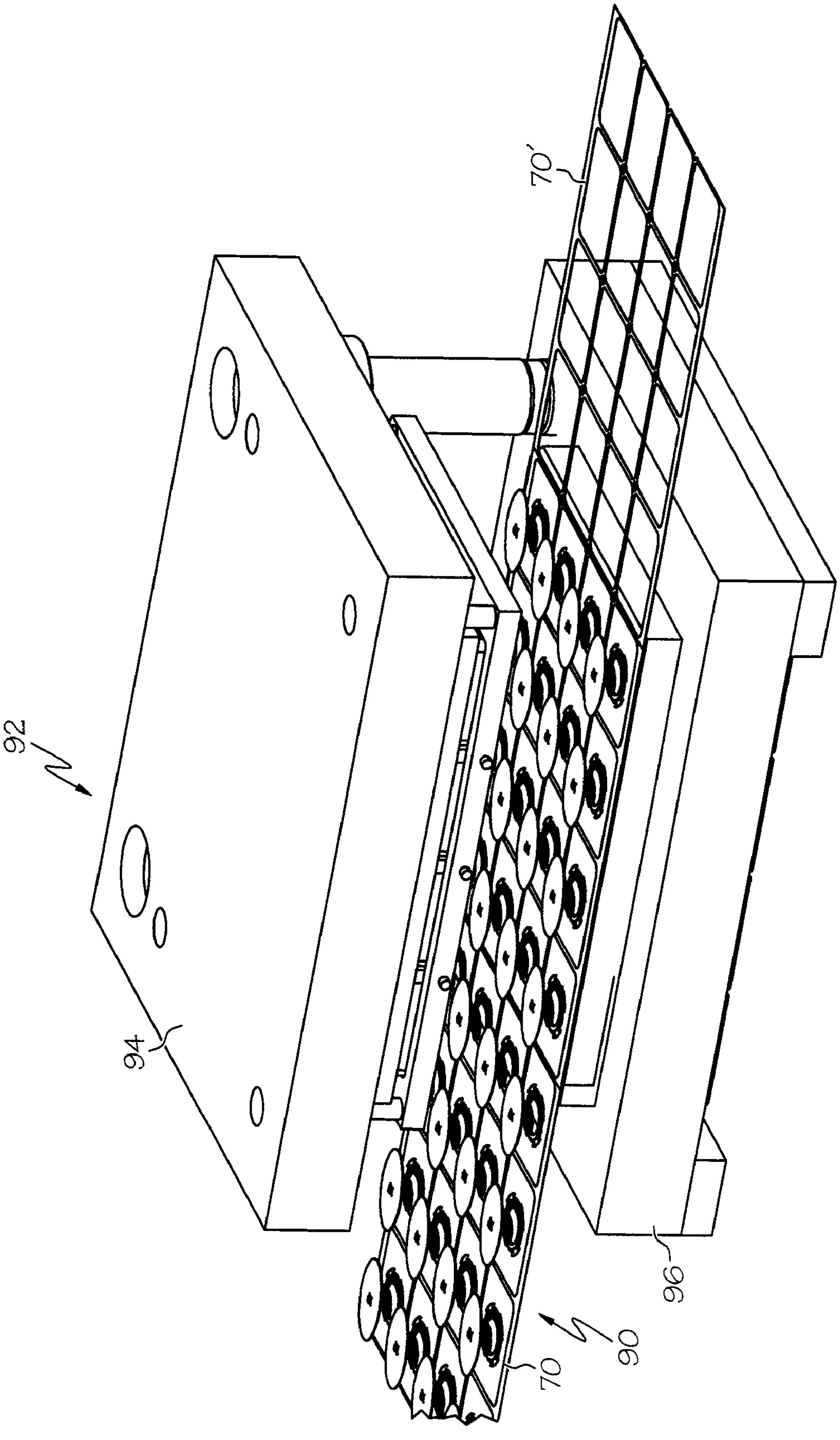
FIG. 12 illustrates another step in the example manufacturing process wherein the first mounting elements are detached from the first sheet in accordance with an aspect of the present invention.
Figure 13:
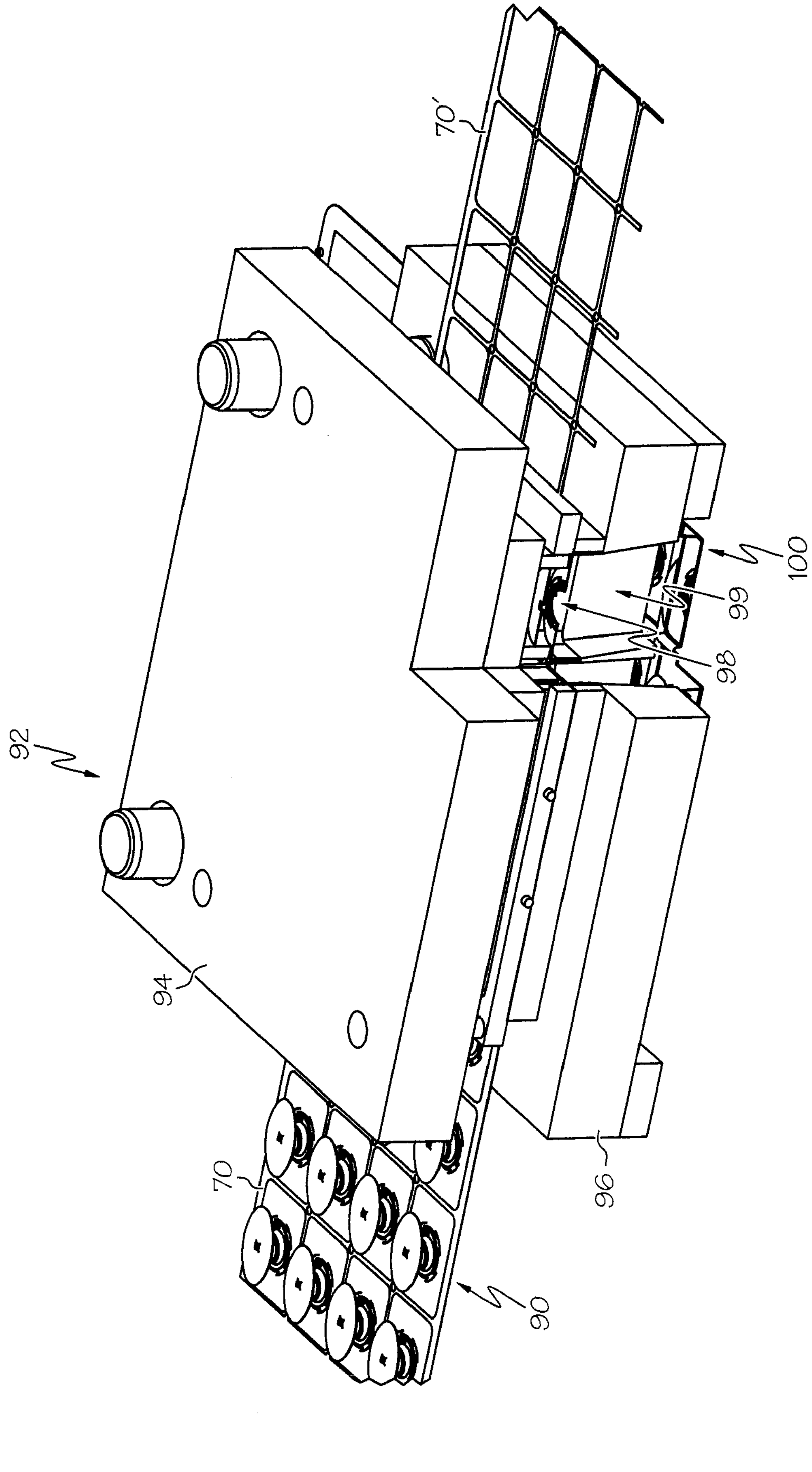
FIG. 13 is similar to FIG. 12, but shows a sectional view of the first mounting elements being detached from the first sheet in accordance with an aspect of the present invention.

Turning now to the operations illustrated in FIGS. 12-13, the first mounting plates 12 can also be detached from the first sheet 70, and the plurality of mounting assemblies 90 can be sorted, packaged, and/or prepared for post-processing. A separation device 92 can be provided, including an upper portion 94 and a lower portion 96. Either or both of the upper and lower portions 94, 96 can be vertically movable relative to each other. As shown in FIG. 12, the upper portion 94 is raised relative to the lower portion 96 to permit entry of the plurality of mounting assemblies 90, or exit of the empty first sheet 70' for disposal.

As shown in FIG. 13, the upper portion 94 is lowered relative to the lower portion 96 to perform the separation operation. In the shown example, the act of lowering the upper portion 94 can perform the separation operation, though a separately movable plunger or the like (not shown) can also be used. As mentioned before, the separation operation can be a die-cut operation performed by a die-cut device 98. Once the separation operation is performed, the separated mounting assembly 10 can travel through a guide channel 99 into a separation tray 100 or the like. The separation tray 100 can include a plurality of chambers or cells adapted to receive each of the mounting assemblies 10 for further processing and/or processing.

Figure 14:
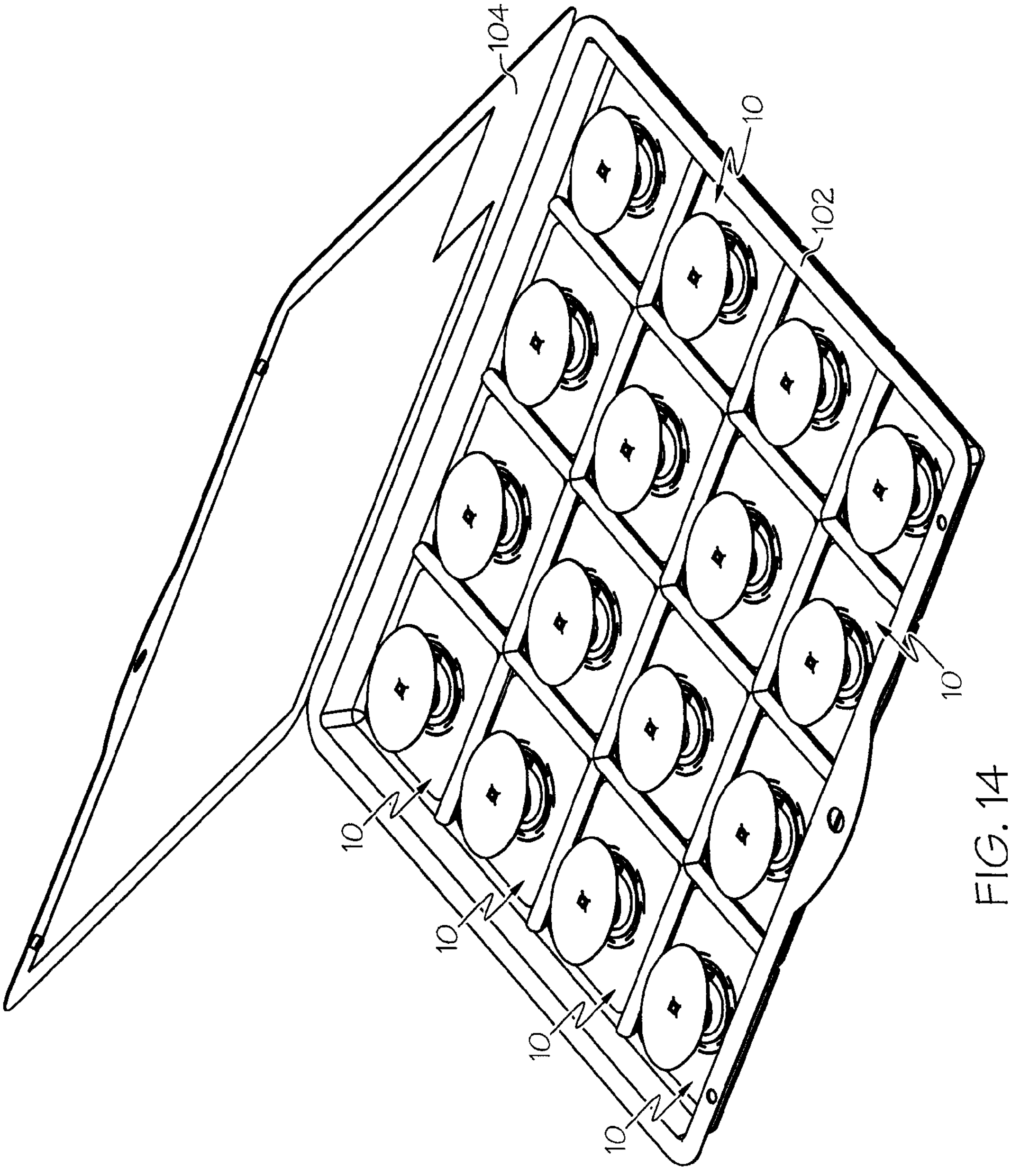
FIG. 14 illustrates another step in the example manufacturing process wherein the completed mounting assemblies are retained in a retail tray in accordance with an aspect of the present invention.

For example, as shown in FIG. 14, the separation tray can include a retail packaging tray 102. The retail packaging tray 102 can include a plurality of the mounting assemblies 10 for individual application by a consumer to various objects and/or support structures. The retail packaging tray 102 can also include a lid 104 for protecting the mounting assemblies 10, and can also include various indicia, branding, sales information, or the like. The retail packaging tray 102 can also include various other materials to form a kit. For example, the kit can include photo paper (not shown) for printing a desired image and at least one action wobble mounting assembly, such as the previously described wobble FIG. 28 or greeting card 32. A variety of fasteners (not shown) can also be provided for securing the wobble image to various surfaces and/or structures. For example, the fasteners can include snaps, hook and loop fasteners, magnets, etc. The kit can also include one or more die cut action figures and/or backgrounds, as well as one or more bases to support the figures and/or backgrounds. In addition or alternatively, the kit can include cardstock (not shown) to create custom greeting cards, books, postage stamps, envelopes, postcards, corporate mailers, magazines, or the like.

Turning now to the example shown in FIGS. 15-16, another method of manufacturing a plurality of mounting assemblies 10 will be described. It is to be appreciated that the previously described method focused on manufacturing mounting assemblies can be more appropriate for retail sale, such as in the retail tray 102 or the like, and that the following method can be more appropriate for commercial sales of large volumes of mounting assemblies 10. For example, the following method may be used to manufacture mounting assemblies 10 on the order of 40,000 per hour or more for mass production and commercial sale. However, either or both of the methods discussed herein can be utilized for retail or commercial sales, as may be appropriate for a particular application of the mounting assemblies 10.

Figure 15:
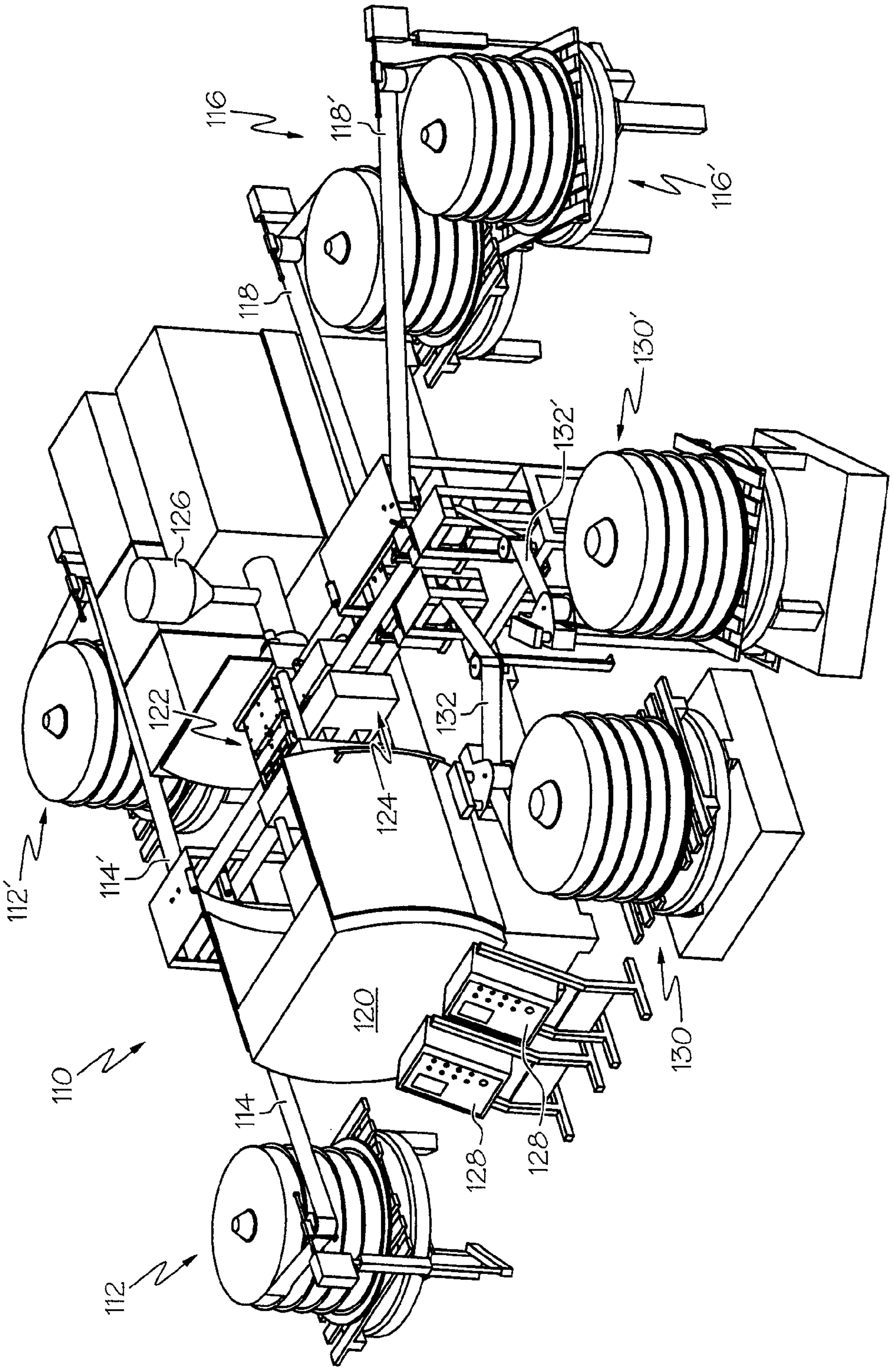
FIG. 15 illustrates a step in an alternate example manufacturing process wherein the mounting assemblies are formed in a continuous process in accordance with another aspect of the present invention.

As shown in FIG. 15, a commercial manufacturing process 110 is shown. The commercial manufacturing process 110 can be of the "reel-to-reel" type configured to supply materials to the process from large reels, and to accept the final products back onto finish reels. However, either or both of the supply materials or finished products can be handled as appropriate to a particular application.

The commercial manufacturing process 110 can include a first supply roll 112 containing a supply of the aforementioned first sheet 114 having the first mounting plates 12. Additionally, a second supply roll 116 can contain a supply of the aforementioned second sheets 118 having the second mounting plates 24. As shown, the first and second sheets 114, 118 can be provided as webs as appropriate to a "reel-to-reel" manufacturing method. It is to be appreciated that the commercial manufacturing process 110 can also include appropriate motors, guides, pulleys, etc. for guiding the first and second sheets 114, 118 through the process.

It is also to be appreciated that, as shown, the commercial manufacturing process 110 can also include a secondary set of first and second supply rolls 112', 116' for providing a secondary set of first and second sheets 114', 118'. The secondary sets can be utilized together with the primary sets to double production, or can also be utilized as a backup set to minimize delays in the manufacturing process. For example, the secondary set can be prepared for use while the primary set is actually being used, and when the primary set is depleted, the secondary set can be utilized while the primary set is re-supplied with fresh materials.

The commercial manufacturing process 110 can further include an assembly device 120 for performing the various assembly steps to form the mounting assemblies 10. The assembly device 120 can include various components, such as a molding component 122 for molding the springs 14 to each of the first mounting plates 12, similar to that discussed in accordance with FIG. 8. An attachment component 124 can be provided subsequent to the molding component 122 for attachment of the second mounting plates 24 to the springs 14, similar to that discussed in accordance with FIGS. 9-10. It is to be appreciated that the assembly device 120 can perform any of the operations discussed herein, and can also perform additional operations as required.

The assembly device 120 can also include various other components, such as a supply component 126 for the thermoplastic, a control system 128, and/or various other elements as may be required. As can be appreciated, the assembly device 120 can be manually operated, though it can also be partly or fully automated, such as by a PLC or various other automation systems. Additionally, robotics or the like can also be employed during the manufacturing process to increase efficiency.

The commercial manufacturing process 110 can further include a finish roll 130 configured to accept the completed mounting assemblies 90 (see FIGS. 9-10) from the assembly device 120. As shown, the assembly device 120 can produce the mounting assemblies 90 in a two-sheet web 132. The two-sheet web 132 can be similar to that shown in FIGS. 9-10, wherein the first and second mounting plates 12, 24 remain attached to the first and second sheets 114, 118, respectively. However, unlike the example of FIGS. 9-10, it can be beneficial during a commercial manufacturing process for both of the first and second mounting plates 12, 24 to have a similar geometry to facilitate separation from the two-sheet web 132. Thus, for example, the first and second mounting plates 12, 24 can both have a rectangular, circular, oval, triangular, and/or polygonal geometry. Additionally, a secondary finish roll 130' can be provided for accepting a secondary two-sheet web 132', similar to that discussed above with the secondary supply rolls 114', 116'.

As an example, each molding cell in the commercial manufacturing process 110 can be capable of producing 19,200,000 pcs/mo with a seven second cycle. This output is based on a three shift, twenty hour work day operating seven days per week. The cell is thus operating approximately 7000 house per year.

The springs can be fully assembled using SMI/3M film product provided on forty inch diameter reels, each forty inch reel weighing approximately 400 lbs. Each reel can have enough material for about 300,000 wobble springs. Four reels of paper (two upper and two lower) can be fed into the molding machine substantially simultaneously. The expected reel life is about twenty hours of operation. A quick change splicing system is planned to keep reel changeover time under five minutes. Reel to reel molding will injection mold film/paper directly to one side of spring. Secondary automation mounted within the molding machine will permanently attach the second layer of paper provided from two secondary reel systems onto opposite surface of the spring, where it will be heat staked or sonic welded in place within the molding machine. The film rolls will be provided on six up skids, requiring the machine cell to be re-loaded approximately once per week. Quality control will be monitored by a suitable vision system. Upon exiting the molding machine, the combined reels of paper with the spring enclosed are then reeled back onto two forty-five inch take up reels. Each forty-five inch reel contains approximately 100,000 wobble springs and weighs between 100 and 150 lbs. The reels can delivered to secondary operations via six layer skids. Each cell can include have four reels feeding in and two take up reels. The take up reels will fill up every three-four hrs, but can be changed while machine is in operation. Finished reels can be stacked on skids (about six reels per skid) with side protectors for either bulk shipment or for use in inserting and folding equipment, as will be described in greater detail herein. Each cell is designed to fit into a single standard machine space.

Figure 16:
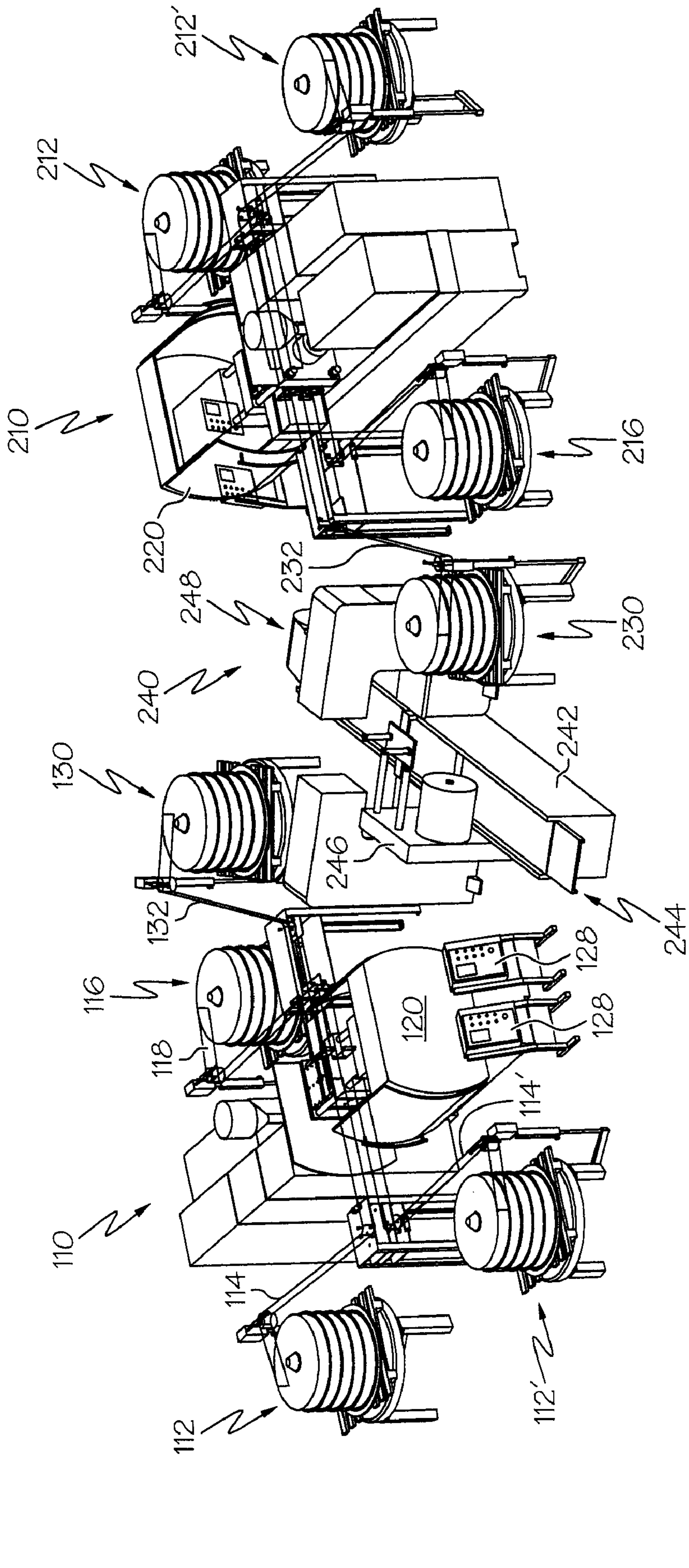
FIG. 16 is similar to FIG. 15, but illustrates another step in the manufacturing process wherein a post-processing operation is used.

Turning now to the example shown in FIG. 16, various post-processing steps can be performed to the finished two-sheet web 132. As shown towards the left-hand side, the commercial manufacturing process 110 can operate as discussed above. The two-sheet web 132 can be stored upon the finish roll 130, and when sufficiently full, the finish roll 130 can be the final product for sale to another commercial entity. The other commercial entity can utilize the mounting assemblies contained thereon in various other separate manufacturing processes.

As shown towards the right-hand side of FIG. 16, a modified commercial manufacturing process 210 can also be used. The modified commercial manufacturing process 210 can include a similar first and second supply rolls 112, 116, assembly device 220, finish roll 230 and two-sheet web 232. However, the modified commercial manufacturing process 210 can also include one or more post-processing operations 240. As shown, the two-sheet web 232 from the finish roll 230 can feed directly into the post-processing operation 240. However, it is to be appreciated that various post-processing operations can be performed immediately following the primary manufacturing operation, or can even be performed at a different time and/or location.

Various post-processing operations 240 can be performed. In one example, the post-processing operation 240 can include a product packaging device, such as a vacuum packaging device, for packaging the mounting assemblies 10 in various manners, such as for sale, storage, transport, etc. In another example, the post-processing operation 240 can include a product-integration device 242. The product-integration device 242 can be configured to integrate each of the mounting assemblies 10 onto another product, such as a book, postage stamps, greeting cards, envelopes, postcards, corporate mailers, magazines, or the like. Thus, the product-integration device 242 can include a product entry end 244 for receiving the various products, an integration component 246 for physically integrating the mounting assemblies 10 onto the product, and an exit end 248 for the finished product. The exit end 248 can include various elements for receiving, packaging, and/or stacking the finished products for sale, and can even include various quality control elements.

The integration component 246 can physically integrate the mounting assemblies 10 onto the product in various manners. For example, as shown in FIGS. 2-4F, the integration component 246 can attach one or more mounting assemblies 10 to each of the wobble figure, greeting card, postage stamp, envelope, postcard, corporate mailer, magazine, or the like. In another example, the integration component 246 can attach an object, such as a postage stamp, a rotating ball, a food item, and/or a promotional item to the mounting assembly 10, which may or may not subsequently be attached to another product.

In still yet another example, the integration component 246 can attach an image (e.g., face 28, wobble image 38, or the like) to the mounting assembly 10. For example, the image can include a photograph that is printed on a substrate. The substrate can be attached to the mounting assembly 10, such as to the first mounting plate 12. The photograph can be received from a remote location (e.g., a location remote to the integration component 246) and attached to the mounting assembly. For example, the one or more photographs can be received from another manufacturing process (e.g., pre-printed photographs) for use with the post-processing operation 240. Further, in order to provide a pleasing appearance such that the photograph is substantially equal in size and shape to the first mounting plate 12, the integration component 246 can trim the photograph during attachment to the mounting assembly 10. For example, the photograph can be attached to the first mounting plate 12, and then both the photograph and the first mounting plate 12 can be trimmed to separate the first mounting plate from the two-sheet web 232. The trimming operation can be similar to the die-cut operation shown in FIGS. 12-13. However, it can be beneficial to simultaneously trim the second mounting plate 24 from the two-sheet web 232. Thus, where the first and second mounting sheets 12, 24 have substantially the same geometry, such as shown in FIG. 1B, a single trimming operation (e.g., a single die-cut operation) can be utilized to trim both of the first and second mounting plates 12, 24 and the photograph. Alternatively, if desired, first and second mounting sheets 12, 24 can be trimmed separately.

An example of a post processing operation includes inserting and folding equipment. The inserting and folding equipment can be used to produce magazine inserts, or twofold or threefold window or windowless mailer or greeting card, as shown in FIG. 4A, for example. For instance, each inserter/folder is capable of inserting and folding up to 40,000 pieces per hour. The unit can include a Multi-feeder MFT 550 unit, for example, fitted with an auto loader (approximately one-two hours of operation per load), which works off of stacked unfolded or folded paper stock (e.g., 1.5 inches to 28 inches wide or reel feed). As the paper is loaded onto the conveyer it passes under a series of one-six modular wobble placer units. Each of these units can place one wobble spring and one corresponding image at a rate of 10,000 springs per hour. To achieve 40,000 springs per hour, four units can work together to place one spring and corresponding image per sheet. After image placement, the product passes through a folding station where the paper can be folded, if desired, in one or more places. The machine can run from stacked media and predetermined artwork or from reel fed media. Upon exiting the machine, the finished product is stacked. An operator thereby removes each stack and places the stacks on skids for shipment or placement into shipping and inserting equipment. Each inserter/folder is designed to operate semi un-attended for eight to ten hours with the operator loading new stacks of product into the autoloader unit approximately every thirty to sixty minutes. The operator unloads and finished product about every 30 minutes. The product can be packaged in a manner similar to which the product was received. For instance the same packing can be reused. Quality control can be maintained by an integrated vision system provided by the automation supplier and incorporated into the turnkey system. Reels can be designed for eight to ten hours of operation at rate, at which point live splicing can occur (up to six reels can live slice before a new skid is brought in (live splicing does not require the machine to stop, the machine can be configured for up to forty-eight hours of continuous operation before the spring supply needs to be replenished). Each cell can require one paper reel feeding system per inserter/folder unit. A typical cell can have four reel feeding systems and four inserter/folder units to operate at 40,000 spring products produced per hour. If one reel runs out, the automation can continue at a reduced rate until the reel is reloaded. The artwork supply (either reel or sheets) will be maintained in the autoloader with an estimated run time of two to three hours of materials per load, and can be continuously replenished without interruption of production. Typical paper reel reload time can be about five minutes (once every forty-eight hours).

If desired, the completed spring and image assembly can be covered with a protective film layer as part of the production process for products such as mailings, etc where protection of the image is necessary. Space requirement can be approximately 22×40 feet per unit. Power requirement can be 220VAC single phase 55 amp breaker, air requirement can be 80 psi clean dry air.

In another example, the integration component 246 can include a printing device, such as a commercial digital printer, offset printer, or the like (not shown) for printing the photographs on a plurality of substrates (not shown), such as photographic paper or other suitable media. The photographs can be printed on to the substrates prior to or subsequent to attachment to the product (e.g., book, postage stamps, greeting cards, envelopes, postcards, corporate mailers, magazines, etc.), though it can be beneficial to print the photographs prior to the attachment step. The images can include digital images (e.g., digital pictures, photographs, symbols, text, etc.) that can be received by the printing device over a computer network. Thus, the integration component 246 can receive the various digital images, print those images onto the substrates, and then attach the substrates to the mounting assemblies 10. As such, the integration component 246 can permit dynamic printing of the digital images onto the substrates to permit a variety of images to be attached to the mounting assemblies. Accordingly, the post-processing operation 240 can permit a dynamic and efficient operation capable of handling various tasks, including custom orders.

It is to be appreciated that the computer network can include various types of computer networks, such as a local area network, wide area network, cellular network, or even the Internet. Thus, because the post-processing operation 240 can permit a dynamic operation, and because the integration component 246 can be operatively connected to the Internet, the post-processing operation 240 can permit custom orders to be received from the customers over the Internet. For example, a customer could order one or more custom mounting assemblies 10 having custom digital images provided to the integration component 246 over the Internet. In one example, a user can log onto a website and select a first object from a plurality of templates. Alternatively, the user can upload a desired image to be used as the first object. The user can then select a desired position on the first object for positioning the mounting assembly 10. The user can select a second object from a plurality of templates or images. Alternatively, the user can upload a desired image to be used as the second object. The customer could provide a digital image of a family member, such as a head-shot similar to the head 26 of FIG. 2, and could request that the mounting assemblies be placed on a particular body, similar to the body 28 of FIG. 2.

A preview of the finished product can be displayed where the user can then select a quantity of desired products and place his/her order. The order can be received by the printer, printed on the substrate, and, if desired, cut, according to the customer's specifications for the first and second objects. The first and second objects are then positioned, or otherwise assembled, with the mounting assembly 10 according to the customer's assembly specifications. Thus, the post-processing operation 240 could accept the mounting assemblies 10 from the additional manufacturing operation 210, receive the digital image from the Internet (e.g., head 26), print the image onto a substrate, attach the substrate to the mounting assemblies, and attach the mounting assemblies to the requested supporting structure (e.g., body 28) to complete the custom order.

Turning now to the examples shown in FIGS. 17 and 18, yet another example mounting assembly 300 will now be discussed. As stated previously, the first mounting element can include various geometries and various materials, such as a flexible attachment structure for use as a paperclip or the like. Though an alternate example is discussed, it is to be appreciated that various other mounting assemblies having various other geometries can be used, and as such the following discussion is not intended to provide a limitation upon the present invention.

Similar to the mounting assembly 10 previously discussed, the alternate mounting assembly 310 shown in FIG. 17 can include a first mounting element 312 attached to a second mounting element 324 by way of a resilient spring 314 having a first and second ends 316, 318. The alternate mounting assembly 310 can include similar structure to that previously discussed herein, such as an aperture 350 being recessed in or extending through the first mounting element 312, and/or second mounting element 324 being attached to the spring 314 by a thermoforming operation (e.g., thermoforming the tip 366 of a stake). It is to be appreciated that various object, such as an image, can be attached to either of the first and second mounting elements 312, 324 as previously discussed herein.

However, the alternate mounting assembly 310 can further include various other structure, geometry, materials, etc. For example, as shown, the first mounting element 312 can further include a base member 330 and a leg member 332 attached to the base member 330. For example, as shown, the base member 330 can be disposed adjacent the aperture 350 and can extend a distance away therefrom. Additionally, the leg member 332 can be attached to the base member 330 at various locations. For example, as shown in FIG. 17, the leg member 332 can be attached to the base member 330 near the aperture 350. Alternatively, as shown in FIG. 18, the leg member 332 can be attached to the base member 330 towards the extended end thereof.

Further, the leg member 332 can be movable relative to the base member 330. For example, the leg member 332 can be resiliently attached to the base member 330. As shown, the leg member 332 can include a first end 336 and a second end 338. The first end 336 can be pivotally attached to the base member 330, and the second end 338 can remain free. Thus, the second end 338 can be selectively offset from the base member 330. For example, the second end 338 can be pivoted upwards or downwards relative to the base member 330 to vary a gap 334 therebetween. As such, the alternative mounting assembly 310 can act as a paperclip or the like. For example, a supporting structure, such as a relatively thin paper product or the like, can be retained within the gap 334 between the base member 330 and leg member 332. Thus, the mounting assembly 310 can be used as a paperclip or the like. Additionally, because the leg member 332 can be resiliently pivotally attached to the base member 330, the resilient force can facilitate retention of the paper product. The leg member 334 can be resiliently and/or pivotally attached to the base member 330 in various manners. For example, as shown, the leg member 334 can be formed with the base member 330 to provide a living hinge or the like. Alternatively, the leg member 334 can be attached to the base member 330 by a hinge-pin interconnection, and can include a resilient spring or the like, though other connections can also be used.

Additionally, it is to be appreciated that the geometry and performance characteristics of the base member 330 and leg member 332 can be varied as required for retention of various supporting structures. For example, the gap 334 can have various sizes to accommodate supporting structures of various thicknesses. In addition or alternatively, the base member 330 and/or the leg member 332 can be formed of a deformable material (e.g., a deformable metal, plastic, or the like) to facilitate retention of a supporting structure. For example, either or both of the base and leg members 330, 332 could wrap about a portion of the supporting structure. In another example, where either or both of the base member 330 or the leg member 332 include a deformable material, the mounting assembly 310 could be adapted to be supported by a generally horizontal surface, such as a desk, tabletop, countertop, or the like.

Turning now to the example shown in FIG. 18, yet another alternate mounting assembly 310' is shown to illustrate that the base and/or leg members 330', 332' can also include various geometries. Similar item numbers are used for clarity, though modified items include a prime designator ('). For example, the first end 336' can be attached to the base member 330' at a location spaced a distance from the aperture 350, while the second end 338' can extend towards the aperture 350. Even so, a gap 334' can still be selectively altered between the base and leg members 330', 332' by selectively offsetting the second end 338'. Thus, the mounting assembly 310' can also be utilized as a paperclip or the like for retaining various supporting structures with the gap 334'. It is to be appreciated that the prior alternate mounting assembly 310 is generally configured to locate the second mounting element 324 away from the supporting structure (e.g., extending away from a book, postage stamp, greeting card, envelope, postcard, corporate mailer, magazine, or the like), while the present mounting assembly 310' is generally configured to locate the second mounting element 324 towards the supporting structure (e.g., extending towards or even within a book, postage stamp, greeting card, envelope, postcard, corporate mailer, magazine, or the like). Thus, the alternate mounting assemblies 310, 310' can be configured for a variety of uses.

Further still, the alternate mounting assemblies 310, 310' can be manufactured using similar steps to those previously disclosed herein. However, more or less steps may also be included. For example, the first mounting element 312 can be molded, such as by an injection molding process or the like. The spring 314 can also be molded. Further, the first mounting element 312 and the spring 314 can be molded and attached substantially simultaneously. Thus, for example, a single mold can be utilized to both form and attach the first mounting element 312 and the spring 314 in a single operation.

Additionally, the mounting assemblies 310, 310' can be manufactured as single units or in mass-produced commercial quantities. For example, the mounting assemblies 310, 310' can be manufactured using steps similar to the "reel-to-reel" commercial manufacturing process discussed herein. In such a "reel-to-reel" process, the first mounting element 312 and spring 314 can be transported by a carrier through the manufacturing process after they are molded. In one example, the carrier can include a webbing, such as a paper or plastic sheet having an adhesive or the like. In another example, during the molding operation that forms the first mounting element 312 and the spring 314, a thin plastic carrier (not shown) can also be simultaneously molded to connect a plurality of the first mounting elements 312 together. The first mounting elements 312 can be subsequently detached form the thin plastic carrier at a later step in the process, similar to that discussed above with reference to the first mounting plate 12 and the first sheet 70. Subsequently, the mounting assemblies 310, 310' can proceed through various other steps and/or post-processing operations, including those discussed herein (e.g., attaching an object and/or image to the second mounting plate 324, packaging operations, etc.), or even various other steps.

The invention has been described with reference to various example embodiments. Obviously, modifications and alterations will occur to others upon a reading and understanding of this specification. It is intended to include all such modifications and alterations insofar as they come within the scope of the appended claims or the equivalents thereof.

The invention claimed is:

1. A method of manufacturing a mounting assembly including the steps of:

providing at least one first mounting element;

molding a resilient spring directly to the first mounting element, the spring including a first end portion and a second end portion, the first end portion being molded to the first mounting element;

providing at least one second mounting element;

attaching the second mounting element to the second end of resilient spring to form the mounting assembly;

providing an object for attachment to the mounting assembly; and attaching the object to either one of the first mounting element and the second mounting element, wherein the first mounting element further includes a stress relief structure adapted to inhibit deformation of the first mounting element when the spring is molded thereto.

2. The method of claim 1, wherein at least one of the first mounting element and the second mounting element includes a plate.

3. The method of claim 1, wherein the first mounting element includes a base member and a leg member resiliently attached to the base member, the leg member being movable relative the base member.

4. The method of claim 1, wherein the spring is a helical spring.

5. The method of claim 2, wherein the spring includes a plurality of coils arranged in a conical geometry such that when the spring is collapsed the coils lie generally along a single plane.

6. The method of claim 1, wherein the step of molding the resilient spring to the first mounting element further includes the step of injection molding the resilient spring using a thermoplastic material.

7. The method of claim 1, wherein the step of molding the resilient spring to the first mounting element further includes the steps of forming the resilient spring and attaching the resilient spring to the first mounting element, the steps of forming and attaching the resilient spring occurring substantially simultaneously.

8. The method of claim 1, wherein the stress relief structure includes at least one slit extending through the first mounting element.

9. The method of claim 1, wherein the first mounting element further includes an aperture extending therethrough, the spring being molded to the first mounting element about a portion of the circumference of the aperture.

10. The method of claim 9, wherein the stress relief structure includes an arcuate slit disposed adjacent the aperture and extending through the first mounting element.

11. The method of claim 9, wherein the spring includes a plurality of coils arranged in a conical geometry such that when the spring is collapsed the spring is received within the aperture and the coils lie generally along a single plane.

12. The method of claim 1, wherein the second mounting element is attached to the second end of the resilient spring by a thermoforming operation.

13. The method of claim 1, further comprising the step of attaching the second mounting element to a support structure.

14. The method of claim 1, wherein the object includes an image.

15. The method of claim 14, wherein the object further includes a substrate, the method further including the steps of receiving the image from a remote location and printing the received image on the substrate.

16. A method of manufacturing a plurality of mounting assemblies including the steps of:

providing a plurality of first mounting elements provided as a first sheet of material;

molding a plurality of resilient springs, each resilient spring being molded directly to a selected one of the plurality of first mounting elements, each spring including a first end portion and a second end portion, the first end portion being molded to the first mounting element;

providing a plurality of second mounting elements provided as a second sheet of material; and attaching each of the plurality of second mounting elements to a selected one of the plurality of resilient springs at the second end of the selected resilient spring to form each mounting assembly.

17. The method of claim 16, wherein the first sheet of material is provided on a first supply roll and the second sheet of material is provided on a second supply roll, the first and second supply rolls configured to supply a generally continuous amount of first and second mounting elements.

18. The method of claim 17, further comprising the steps of providing a finish roll, and storing the completed mounting assemblies upon the finish roll.

19. The method of claim 18, further comprising the steps of providing a plurality of objects for attachment to each of the mounting assemblies, and attaching one of the plurality of objects to each of the plurality of first mounting elements.

20. The method of claim 19, wherein the plurality of objects further include a plurality of images.

21. The method of claim 20, wherein objects further include a plurality of substrates, the method further including the steps of receiving the plurality of images from a remote location and printing the received images on the plurality of substrates.

22. The method of claim 21, wherein the plurality of images include digital images, the digital images being received from a remote location over a computer network.

23. The method of claim 22, wherein the computer network is operatively connected to the Internet.

24. The method of claim 16, further comprising the step of attaching the plurality of second mounting elements to a plurality of support structures.

25. The method of claim 16, wherein the step of molding the plurality of resilient springs directly to the plurality of first mounting elements further includes the step of injection molding the resilient springs using a thermoplastic material.

26. The method of claim 16, wherein the step of molding the plurality of resilient springs directly to the plurality of first mounting elements further includes the steps of forming the resilient springs and attaching the resilient springs to the first mounting elements, the steps of forming and attaching the resilient springs occurring substantially simultaneously.

27. The method of claim 16, wherein the second mounting elements are attached to the second ends of the resilient springs by a thermoplastic operation.

28. The method of claim 16, wherein each of the first mounting elements further includes a stress relief structure.

29. The method of claim 16, wherein at least one of the plurality of first mounting elements and the plurality of second mounting elements includes a plate.

30. The method of claim 16, wherein the plurality of first mounting elements each include a base member and a leg member resiliently attached to the base member, the leg member being movable relative to the base member.

31. A mounting assembly for an object, including:

a first mounting element including an aperture defined by a peripheral edge;

a resilient spring including a first end portion and a second end portion, the first end portion being attached to at least a portion of the peripheral edge of the aperture;

a second mounting element attached to the second end of resilient spring; and an object secured to either one of the first mounting element and the second mounting elements, wherein the first mounting element further includes a stress relief structure adapted to inhibit deformation of the first mounting element when the spring is attached thereto.

32. The mounting assembly of claim 31, wherein the spring includes a plurality of coils arranged in a conical geometry such that when the spring is collapsed the coils are received within the aperture and lie generally along a single plane.

33. The mounting assembly of claim 31, wherein the second mounting element is attached to the second end of the resilient spring by a thermoforming operation.

34. The mounting assembly of claim 31, wherein at least one of the first mounting element and the second mounting element further includes an adhesive.

35. The mounting assembly of claim 31, wherein the object further includes an image.

36. A mounting assembly for an object, including:

a first mounting element including an aperture defined by a peripheral edge;

a resilient spring including a first end portion and a second end portion, the first end portion being attached to at least a portion of the peripheral edge of the aperture;

a second mounting element attached to the second end of resilient spring; and an object secured to either one of the first mounting element and the second mounting elements;

wherein the object further includes an image, and wherein the object further includes a substrate, the image being received from a remote location and printed on the substrate.

37. The mounting assembly of claim 31, wherein the stress relief structure includes at least one arcuate slit.

38. The mounting assembly of claim 37, wherein the stress relief structure includes a plurality of arcuate slits, at least one of the arcuate slits being concentric with another of the arcuate slits.

39. The mounting assembly of claim 37, wherein the stress relief structure includes a plurality of arcuate slits, at least one of the arcuate slits being radially offset from another of the arcuate slits.

40. The mounting assembly of claim 31, wherein at least one of the first mounting element and the second mounting element includes a plate.

41. The mounting assembly of claim 31, wherein the first mounting element includes a base member and a leg member resiliently attached to the base member, the leg member being movable relative the base member.

42. A method of manufacturing a mounting assembly including the steps of:

providing at least one first mounting element having a stress relief structure formed therein;

molding a resilient spring directly to the first mounting element, the spring including a first end portion and a second end portion, the first end portion being molded to the first mounting element, the first mounting element and the resilient spring being molded substantially simultaneously;

providing at least one second mounting element;

attaching the second mounting element to the second end of resilient spring to form the mounting assembly;

providing an object for attachment to the mounting assembly; and attaching the object to either one of the first mounting element and the second mounting element, wherein the stress relief structure is adapted to inhibit deformation of the first mounting element when the spring is molded thereto.

43. The method of claim 42, wherein at least one of the first mounting element and the second mounting element includes a plate.

44. The method of claim 42, wherein the first mounting element includes a base member and a leg member attached to the base member, the leg member being movable relative to the base member.

45. The method of claim 44, wherein the leg member includes a first end and a second end, the first end being resiliently attached to the base member, the second end being adapted to be selectively offset from the base member.

46. The method of claim 42, wherein the object includes an image.

47. A mounting assembly for an object, including:

a first mounting element including an aperture defined by a peripheral edge, the first mounting element further including a base member and a leg member attached to the base member;

a resilient spring including a first end portion and a second end portion, the first end portion being attached to at least a portion of the peripheral edge of the aperture;

a second mounting element attached to the second end of resilient spring; and an object secured to either one of the first mounting element and the second mounting elements, wherein the first mounting element includes a stress relief structure adapted to inhibit deformation of the first mounting element when the spring is attached thereto.

48. The mounting assembly of claim 47, wherein the first mounting element and the resilient spring are molded together substantially simultaneously.

49. The mounting assembly of claim 47, wherein at least one of the first mounting element and the second mounting element includes a plate.

50. The mounting assembly of claim 47, wherein the leg member is movable relative the base member.

51. The mounting assembly of claim 50, wherein the leg member is resiliently attached to the base member.

52. The mounting assembly of claim 50, wherein the leg member includes a first end and a second end, the first end being pivotally attached to the base member, the second end being adapted to be selectively offset from the base member.

53. The method of claim 47, wherein the object includes an image.

54. A mounting assembly for an object, including:

a first mounting element including an aperture defined by a peripheral edge;

a resilient spring including a first end portion and a second end portion, the first end portion being attached to at least a portion of the peripheral edge of the aperture;

a second mounting element attached to the second end of resilient spring; and an object secured to either one of the first mounting element and the second mounting elements, wherein the first mounting element further includes a stress relief structure, and wherein the stress relief structure includes at least one arcuate slit.

* * * * *